United States Patent
Sudarsanam et al.

(10) Patent No.: US 10,956,364 B2
(45) Date of Patent: Mar. 23, 2021

(54) EFFICIENT DATA SYNCHRONIZATION FOR STORAGE CONTAINERS

(71) Applicant: Tintri by DDN, Inc., Santa Clara, CA (US)

(72) Inventors: Raj Ashok Sudarsanam, Fremont, CA (US); Edward K. Lee, Dublin, CA (US); Mark G. Gritter, Eagan, MN (US); Pratap V. Singh, Mountain View, CA (US)

(73) Assignee: Tintri by DDN, Inc., Santa Clara, CA (US)

(*) Notice: Subject to any disclaimer, the term of this patent is extended or adjusted under 35 U.S.C. 154(b) by 330 days.

(21) Appl. No.: 15/690,626

(22) Filed: Aug. 30, 2017

(65) Prior Publication Data

US 2018/0004764 A1    Jan. 4, 2018

Related U.S. Application Data

(63) Continuation of application No. 14/202,836, filed on Mar. 10, 2014, now Pat. No. 9,817,835.

(60) Provisional application No. 61/777,342, filed on Mar. 12, 2013.

(51) Int. Cl.
*G06F 16/11* (2019.01)
*G06F 16/178* (2019.01)
*G06F 9/455* (2018.01)

(52) U.S. Cl.
CPC ........ *G06F 16/128* (2019.01); *G06F 9/45558* (2013.01); *G06F 16/178* (2019.01); *G06F 2009/4557* (2013.01)

(58) Field of Classification Search
CPC ..... G06F 16/22; G06F 16/128; G06F 9/45558
See application file for complete search history.

(56) References Cited

U.S. PATENT DOCUMENTS

| | | | |
|---|---|---|---|
| 6,526,574 B1 | 2/2003 | Jones | |
| 6,594,744 B1 * | 7/2003 | Humlicek | G06F 3/0601 707/999.202 |
| 7,809,759 B1 | 10/2010 | Bruso | |
| 8,463,825 B1 | 6/2013 | Harty | |
| 8,612,488 B1 | 12/2013 | Subramanya | |
| 2002/0161781 A1 | 10/2002 | Leong | |
| 2003/0120863 A1 | 6/2003 | Lee | |
| 2003/0182292 A1 | 9/2003 | Leong | |

(Continued)

FOREIGN PATENT DOCUMENTS

| | | |
|---|---|---|
| JP | 2009146389 A | 7/2009 |
| JP | 2010191647 A | 9/2010 |
| JP | 2012216025 B2 | 11/2012 |

OTHER PUBLICATIONS

"Data Synchronization", Aug. 8, 2016, Techopedia, www.techopedia.com/definition/1006/data-synchronization.

(Continued)

*Primary Examiner* — Sheryl L Holland
(74) *Attorney, Agent, or Firm* — Van Pelt, Yi & James LLP

(57) ABSTRACT

Performing data synchronization is disclosed, including: receiving an indication to synchronize a container to a snapshot, wherein the container has a first data state and an identity, wherein the snapshot corresponds to a second data state; causing the container to have the second data state corresponding to the snapshot; and maintaining the identity of the container.

18 Claims, 16 Drawing Sheets

(56) References Cited

U.S. PATENT DOCUMENTS

| | | |
|---|---|---|
| 2004/0030727 A1 | 2/2004 | Armangau |
| 2004/0205296 A1* | 10/2004 | Bearden .............. G06F 12/0866 |
| | | 711/129 |
| 2004/0267836 A1 | 12/2004 | Armangau |
| 2005/0188049 A1 | 8/2005 | Perret |
| 2006/0112151 A1 | 5/2006 | Manley |
| 2006/0235892 A1 | 10/2006 | Kalach |
| 2007/0043574 A1 | 2/2007 | Coffman |
| 2007/0055833 A1 | 3/2007 | Vu |
| 2007/0083567 A1 | 4/2007 | Arai |
| 2007/0088729 A1* | 4/2007 | Baca ....................... G06F 9/451 |
| 2007/0106706 A1 | 5/2007 | Ahrens |
| 2007/0208918 A1 | 9/2007 | Harbin |
| 2007/0260830 A1 | 11/2007 | Faibish |
| 2007/0271365 A1 | 11/2007 | Revanuru |
| 2007/0283111 A1 | 12/2007 | Berkowitz |
| 2008/0082593 A1 | 4/2008 | Komarov |
| 2008/0155223 A1 | 6/2008 | Hiltgen |
| 2008/0244028 A1 | 10/2008 | Le |
| 2009/0260007 A1 | 10/2009 | Beaty |
| 2009/0276774 A1 | 11/2009 | Kinoshita |
| 2009/0307450 A1 | 12/2009 | Lee |
| 2010/0023716 A1 | 1/2010 | Nemoto |
| 2010/0070726 A1 | 3/2010 | Ngo |
| 2010/0122248 A1* | 5/2010 | Robinson ................ G06F 9/485 |
| | | 718/1 |
| 2010/0257403 A1 | 10/2010 | Virk |
| 2010/0262617 A1 | 10/2010 | Shinjo |
| 2011/0035359 A1 | 2/2011 | Bendakovsky |
| 2011/0153697 A1 | 6/2011 | Nickolov |
| 2011/0320404 A1 | 12/2011 | Akulavenkatavara |
| 2012/0005672 A1 | 1/2012 | Cervantes |
| 2012/0005673 A1* | 1/2012 | Cervantes .......... G06F 9/45558 |
| | | 718/1 |
| 2012/0011106 A1 | 1/2012 | Reid |
| 2012/0016839 A1 | 1/2012 | Yueh |
| 2012/0079221 A1 | 3/2012 | Sivasubramanian |
| 2012/0278799 A1* | 11/2012 | Starks ..................... G06F 9/455 |
| | | 718/1 |
| 2012/0317079 A1* | 12/2012 | Shoens ............... G06F 11/1612 |
| | | 707/639 |
| 2012/0323853 A1 | 12/2012 | Fries |
| 2012/0330964 A1 | 12/2012 | Baude |
| 2013/0262801 A1 | 10/2013 | Sancheti |
| 2014/0025872 A1 | 1/2014 | Flynn |
| 2014/0052761 A1 | 2/2014 | Teitelbaum |
| 2014/0089265 A1 | 3/2014 | Talagala |
| 2014/0095823 A1 | 4/2014 | Shaikh |
| 2014/0136578 A1* | 5/2014 | Wood .................... G06F 16/196 |
| | | 707/821 |
| 2015/0339302 A1* | 11/2015 | Dwarampudi ...... G06F 11/1448 |
| | | 707/667 |
| 2016/0188652 A1* | 6/2016 | Goo .................... G06F 16/2358 |
| | | 707/667 |

OTHER PUBLICATIONS

"Data Synchronization", Aug. 8, 2016, Wikipedia, en.wikipedia.org/wiki/Data_synchronization.

Author Unknown, "NetApp SnapRestore software uses stored Snapshot copies to recover entire file systems or data volumes in seconds.", Retrieved Jan. 25, 2013 version via Internet Archive Wayback Machine at https://web.archive.org/web/20130125111645/http://www.netapp.com/us/products/protection-software/snaprestore.aspx on Jan. 25, 2016.

Author Unknown, "rysnc—Wikipedia", accessed Jul. 23, 2013 version on Nov. 5, 2014 via the Internet Wayback Machine, https://web.archive.org/web/20120619201533/http://en.wikipedia.org/wiki/Rsync.

Ben Escoto "rdiff-backup(1)—Linux man page", accessed Jul. 5, 2012 version on Nov. 5, 2014 via the Internet Wayback Machine, https://web.archive.org/web/20120705001700/http://linux.die.net/man/1/rdiff-backup.

Laverick et al., "Administering VMware View™ 4.5", Jan. 1, 2010, Retrieved from the Internet: URL: http://cdn.ttgtmedia.com/rms/pdf/view4.5-rtfm-guide-GAAE-1.pdf [retrieved on Aug. 5, 2016].

Martin Pool, "rdiff(1)—Linkux man page", accessed Jun. 29, 2012 version on Nov. 5, 2014 via the Internet Wayback Machine, https://web.archive.org/web/20120629053647/http://linux.die.net/man/1/rdiff.

Ohad Rodeh, "B-trees, shadowing, and clones", ACM Transactions on Storage, vol. 3, No. 4, pp. 1-27, Feb. 1, 2008.

U.S. Appl. No. 13/938,005, filed Jul. 9, 2013.

* cited by examiner

| Time | Current B-tree and Snapshot(s) | User Visible Snapshot History |
|---|---|---|
| T0 | Cur | |
| T1 | Cur → S1 | S1 |
| T2 | Cur → S2 → S1 | S2 S1 |

FIG. 3

| Time | Current B-tree and Snapshot(s) | User Visible Snapshot History |
|---|---|---|
| T0 | A: Cur → S2 → S1<br>B: Cur → S11 | A: S2 S1<br>B: S11 |
| T1 | A: Cur ⟶ S2 → S1<br>B: Cur → S11 | A: S2 S1<br>B: S11 |
| T2 | A: Cur → S3 ⟶ S2 → S1<br>B: Cur → S11 | A: S3 S2 S1<br>B: S11 |

FIG. 7

EFFICIENT DATA SYNCHRONIZATION FOR STORAGE CONTAINERS

CROSS REFERENCE TO OTHER APPLICATIONS

This application is a continuation of co-pending U.S. patent application Ser. No. 14/202,836 entitled EFFICIENT DATA SYNCHRONIZATION FOR STORAGE CONTAINERS filed Mar. 10, 2014 which claims priority to U.S. Provisional Patent Application No. 61/777,342 entitled EFFICIENT DATA SYNCHRONIZATION FOR STORAGE CONTAINERS filed Mar. 12, 2013 both of which are incorporated herein by reference for all purposes.

BACKGROUND OF THE INVENTION

In some instances, an administrator user may wish to copy the state of a snapshot in the file system to a virtual machine. For example, the administrator user may wish to copy the state of the snapshot in order to quickly use data associated with that state or to revert the current state of the virtual machine to a former state captured by the snapshot. However, some conventional systems enable copying the state of a snapshot by creating a new copy of the data associated with that state for the virtual machine, which could be time consuming and space inefficient. Moreover, copying the state of the snapshot will replace the entire state of the virtual machine including its "identity," which in many cases is undesirable.

BRIEF DESCRIPTION OF THE DRAWINGS

Various embodiments of the invention are disclosed in the following detailed description and the accompanying drawings.

FIG. 3 is a table showing an embodiment of how snapshots are created for a container over time.

FIG. 7 is a diagram showing an example of synchronization of container A to a snapshot associated with container B.

DETAILED DESCRIPTION

Figure 1:
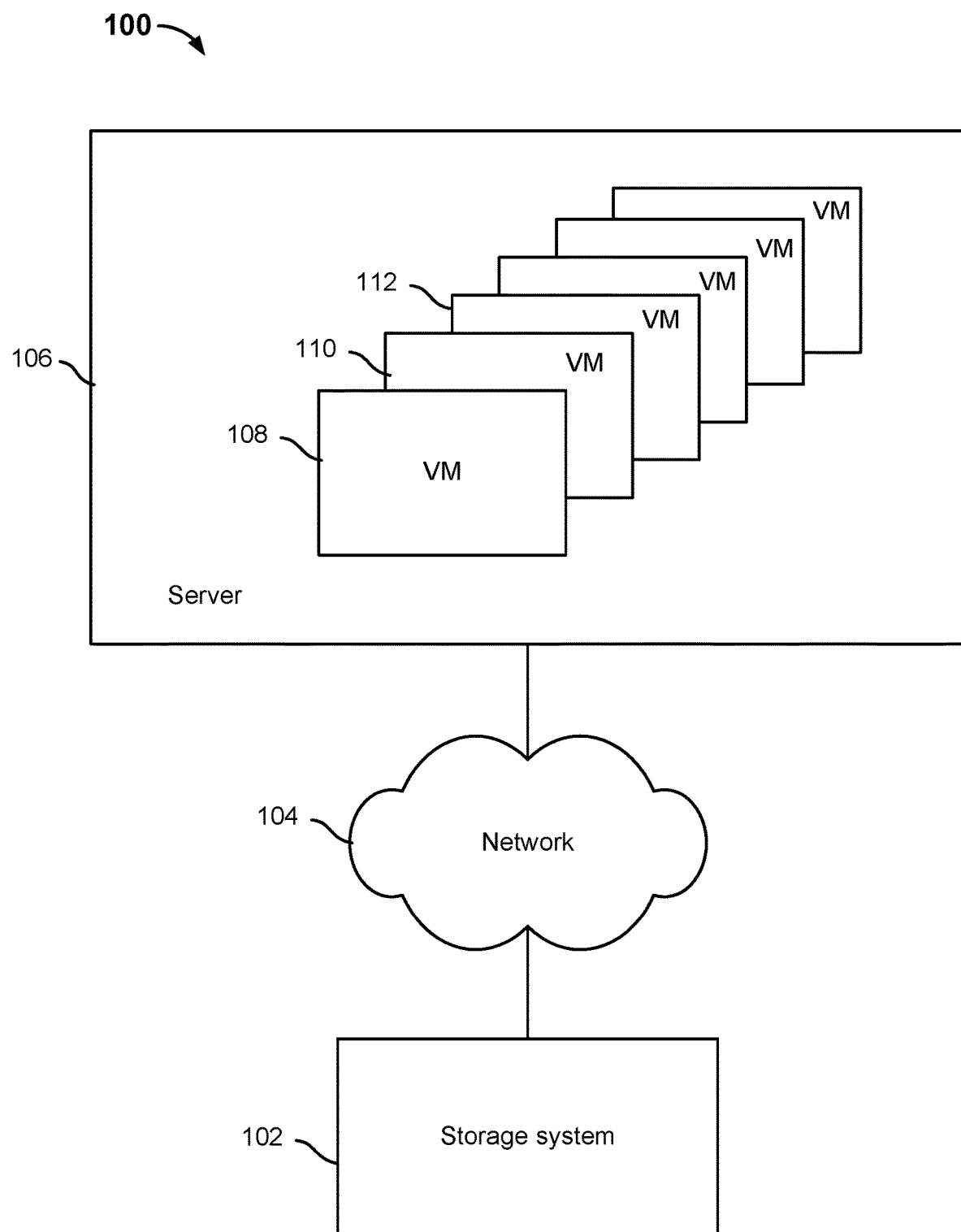
FIG. 1 is a diagram showing an embodiment of a storage system for the storage of VMs using virtual machine storage abstractions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of efficient data synchronization for storage containers described herein allow an administrator to instantaneously change the current state of a storage container to that of any snapshot (e.g., a read-only copy) while preserving the "identity" of the container. In various embodiments, a storage "container" refers to any identifiable set of data. Examples of a container include a file, a virtual disk (sometimes referred to as a "vdisk"), a data object, or a virtual machine (sometimes referred to as a "VM"). In various embodiments, an "identity" of a container refers to data and/or metadata associated with the container that is used by the storage system to identify and customize the container for a particular use. In various embodiments, criteria for establishing the identity of a container vary depending on the type of container. For a file, the identity may be determined by its inode number or file handle. For a vdisk, it may be determined by a disk signature written to the disk. For a VM, the identity may be determined by a universally unique identifier (UUID) and/or security identifier (SID), stored in the VM configuration or member vdisk by the hypervisor management system and/or guest operating system (OS). In the case of VMs, for example, customization may refer to the name of the VM, IP addresses used by the VM to provide services, or rights to use various resources not directly a part of the VM.

Synchronization is highly flexible in that a container may be synchronized to a snapshot of any other container in the system. In some embodiments, a container comprising a VM may be synchronized to any snapshot of the same type of VM. In some embodiments, a container comprising a VM may be synchronized to a snapshot of any type of VM, where the type of VM may, for example, be determined by the type of guest operating system running in the VM or the number and size of vdisks contained within the VM. In some embodiments, a container may be synchronized to a snapshot associated with a different container. In some embodiments, a container may be synchronized to a snapshot associated with the same container, which is sometimes referred to as "self synchronization."

In the following six examples, the data state of the container is synchronized to a snapshot while the identity of the container as seen by users of the storage system is preserved. To a user, it looks as if only the content of the container has changed after the synchronization.

Case 1: John has accidentally corrupted the file system in his VM. To recover from this corruption, he synchronizes/restores his VM to the snapshot that was created last night for his VM.

Case 2: Sue has installed over 1000 productivity applications on her VM. Paul would like to have these applications on his VM as well, but does not want to take the time to install each one. In order to quickly obtain these productivity applications, he synchronizes his application vdisk to the latest snapshot of Sue's application vdisk. After the synchronization, Paul's vdisk contains the new productivity applications, but still has its original identity (e.g., disk signatures, volume name, etc.), and not that of Sue's vdisk.

Case 3: Pat has created 500 development VMs for the engineering organization, based off the latest snapshot of a Fedora VM. One month later, an important security patch for Fedora is released. Pat does not want to create new VMs for the engineers, nor does he want to manually apply the patch to each development VM. Instead, he applies the patch to the base VM, creates a new snapshot, then synchronizes the OS vdisk in each development VM to this new snapshot.

Case 4: Prior to beta testing, Bill created 30 test and development VMs from a base VM running a database application. During beta testing, the database in the production VM was significantly updated. Now that testing is complete, Bill would like each test and development VM to have the latest version of the database. To do this, he first takes a snapshot of the production VM, then he synchronizes the database vdisk in each test and development VM to this snapshot.

Case 5: The system administrator would like to replace a VM that offers a service, such as a web server or build server, with a new version of the VM that offers the same service. To do this, he/she first takes a snapshot of the new VM, then synchronizes the original VM to this snapshot. This replaces the vdisks used by the original VM with those from the snapshot, while preserving the identity of the original VM.

Case 6: Michael is upgrading the VM that is running an application. Unfortunately, the upgrade does not go as planned, so the state of the VM needs to be rolled back to a former state. Michael performs this roll back by synchronizing the application VM to the snapshot of the application VM that was created prior to starting the upgrade.

In various embodiments, an indication is received to synchronize a container having a first data state and an identity to having a second data state corresponding to a snapshot. The container is caused to have the second data state corresponding to the snapshot. The identity of the container is maintained subsequent to the container being caused to have the second data state.

In some cases, sometime after the synchronization process has completed and the identity of the container is preserved, as deemed by the user, it may be useful to then modify the identity of the container. In such cases, the identity of the container may be modified to be the same as the identity of the snapshot to which the container is synchronized, or the identity of some other existing container, or a new identity that did not previously exist.

In various embodiments, synchronization is implemented in terms of sequences of snapshots. In some embodiments, a snapshot comprises a data structure (e.g., a tree data structure). An example of a snapshot data structure is a B-tree. A B-tree includes logical offsets that are mapped to physical offsets. Thus, a "user" performs read and write operations using the logical offsets that are mapped to physical offsets in a snapshot. The physical offsets can then be used to read and write data from the underlying physical storage devices. Read operations lookup the logical offset in a B-tree to find the corresponding physical offset, while write operations create new mappings or update existing mappings in a current B-tree that represents the current data state of a container.

In various embodiments, synchronization is implemented in terms of sequences of B-trees corresponding to snapshots (read-only copies) that may terminate by referring to a B-tree from another container or snapshot sequence. In some embodiments, each B-tree efficiently encodes a container's data state as of a particular point in time by storing only changes that have been made between snapshots. As will be described in further detail below, each snapshot B-tree stores mappings for only those writes that have been made to the container since the previous snapshot was created.

FIG. 1 is a diagram showing an embodiment of a storage system for the storage of VMs using virtual machine storage abstractions. In the example shown, system 100 includes server 106, network 104, and storage system 102. In various embodiments, network 104 includes various high-speed data networks and/or telecommunications networks. In some embodiments, storage system 102 communicates with server 106 via network 104. In some embodiments, the file system for the storage of VMs using virtual machine storage abstractions does not include network 104, and storage system 102 is a component of server 106. In some embodiments, server 106 is configured to communicate with more storage systems other than storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 108, 110, and 112 running on server 106 are stored on storage system 102.

In various embodiments, storage system 102 is configured to store meta-information identifying which stored data objects, such as files or other virtual machine storage abstractions, are associated with which VM or vdisk. In various embodiments, storage system 102 stores the data of VMs running on server 106 and also stores the metadata that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 102 refers to one or more physical systems and/or associated hardware and/or software components configured to work together to store and manage stored data, such as files or other stored data objects. In some embodiments, a hardware component that is used to (at least in part) implement the storage system may be comprised of either disk or flash, or a combination of disk and flash.

Figure 2:
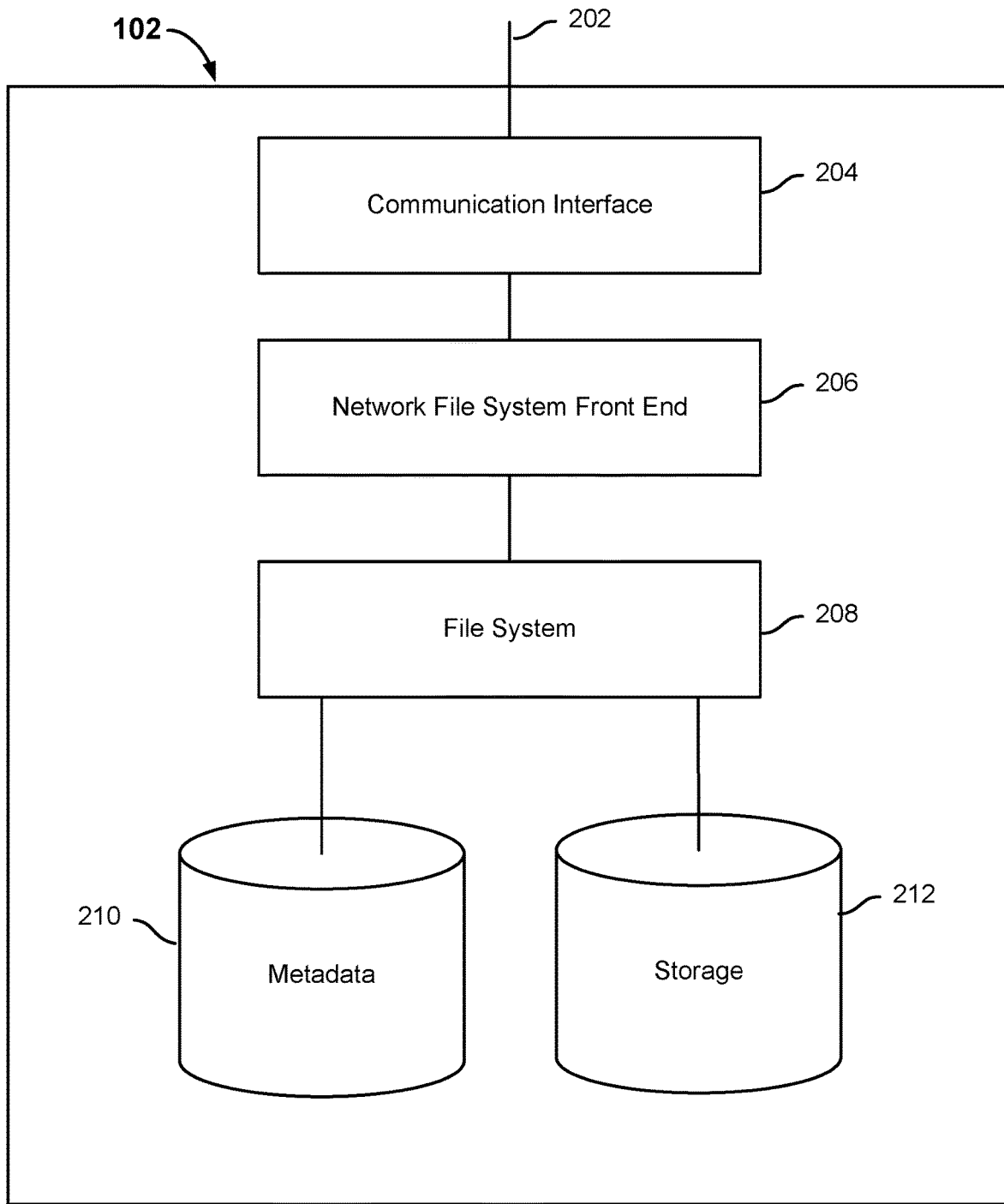
FIG. 2 is a block diagram illustrating an embodiment of a storage system including data and metadata.

FIG. 2 is a block diagram illustrating an embodiment of a storage system including data and metadata. In the example shown, storage system 102 includes a network connection 202 and a communication interface 204, such as a network interface card or other interface, which enable the storage system to be connected to and communicate via a network such as network 104 of FIG. 1. The storage system 102 further includes a network file system front end 206 configured to handle NFS requests from virtual machines running on systems such as server 106 of FIG. 1. In various embodiments, the network file system front end is configured to associate NFS requests as received and processed with a corresponding virtual machine and/or vdisk with which the request is associated, for example, using meta-information stored on storage system 102 or elsewhere. The storage system 102 includes a file system 208 configured and optimized to store VM data. In the example shown, metadata 210 comprises a database (or multiple databases) that is configured to store sets of metadata associated with various containers. For example, a container comprises a VM, a vdisk, or a file. Storage 212 may comprise at least one tier of storage. In some embodiments, storage 212 may comprise at least two tiers of storage, where the first tier of storage comprises flash or other solid state disk (SSD) and the second tier of storage comprises a hard disk drive (HDD) or other disk storage. In various embodiments, a set of metadata stored at metadata 210 includes at least one data structure (e.g., B-tree) that includes mappings to locations in storage 212 at which data of a container (e.g., VM, vdisk, or file) associated with the set of metadata is stored. In some embodiments, a set of metadata stored at metadata 210 includes at least a B-tree that is a snapshot that maps to data stored in storage 212 associated with a container's state at an earlier point in time. In some embodiments, an identity of a container whose underlying data is stored in storage 212 comprises a set of metadata stored at metadata 210 and/or data stored at storage 212.

In some embodiments, a set of metadata stored at metadata 210 includes at least a special data structure (that is sometimes referred to as a "user history data structure") that tracks all the snapshots associated with a container whose data is stored in storage 212. The user history data structure stores data indicating which snapshots are associated with the container, including snapshots created before and/or after one or more synchronization processes. In some embodiments, snapshots indicated by data stored in the user history data structure associated with a container correspond to snapshots that are included in a user visible snapshot history, which comprises a display to a user at a user interface.

A current data state of a container may be synchronized to a snapshot stored in metadata 210. The snapshot to which the container is to be synchronized may be associated with the same container or a different container. Synchronizing a container to the snapshot includes causing the container to have the same content (data state) of the snapshot. For example, the container can be synchronized to the snapshot by causing a B-tree associated with the container's current data state (this B-tree is sometimes referred to as a "current B-tree") to point to the snapshot. In some embodiments, synchronizing the container to the snapshot includes preserving an identity of the container such that the container can continue to be recognized by the system as the same container prior to the synchronization process.

In some embodiments, sometime after the synchronization process has completed, the identity of that container that was preserved during the synchronization may be modified (e.g., in response to a user input). For example, the identity of the container can be modified to be another existing identity or to be a new identity. Modifying the identity of the container after a synchronization may include modifying an existing data structure and/or creating new data structures.

FIG. 3 is a table showing an embodiment of how snapshots are created for a container over time. While B-trees are used in the example, in practice, other data structures such as hash tables may be used as well. In the example of FIG. 3, the "Cur" or current B-tree contains changes that have been made to a container since the most recent snapshot was created. The current B-tree is modifiable, unlike snapshots, which are read-only. Any changes to the data state of the container are updated in the current B-tree. When it is time to create a snapshot for the container, the snapshot will be generated based on the current B-tree. Therefore, all writes update the current B-tree in order to accumulate the set of changes for creating the next snapshot B-tree. A snapshot that is created after another snapshot is sometimes referred to as being the "younger" snapshot of the two snapshots. A snapshot that is created before another snapshot is sometimes referred to as being the "older" snapshot of the two snapshots.

At time T0, no snapshots have yet been generated for the container so the user visible snapshot history includes no snapshots. At time T1, Snapshot S1 is created which reflects all writes made to the container as of time T1. An example way to create Snapshot S1 is to rename the then-current B-tree as S1 and create a new, empty current B-tree. The B-tree S1 corresponds to Snapshot S1 and, therefore, contains all changes made between times T0 and T1. The user visible snapshot history shows Snapshot S1 at time T1. At time T2, a second snapshot, Snapshot S2, is created from the then-current B-tree created after snapshot S1 was created. Snapshot S2 contains all changes made between times T1 and T2. At time T2, user visible snapshot history shows Snapshots S2 and S1. Thus, Snapshots S2 and S1 form a sequence of snapshots that terminates with Snapshot S1. Snapshot S2 can be referred to as being the "younger" snapshot relative to Snapshot S1, and Snapshot S1 can be referred to as being the "older" snapshot relative to Snapshot S2.

In performing a read of the contents of a container, the search for the requested data starts at the current B-tree, and if the requested data is not found in the current B-tree, the requested data is successively searched in each earlier snapshot until a relevant mapping is found, or until the last snapshot (the oldest snapshot) in the sequence of snapshots is reached. In the example of FIG. 3, to perform a read operation on the container after time T2, the current B-tree would be searched first, then snapshot B-tree S2, and then snapshot B-tree S1 until the relevant mapping is found. To reduce the number of lookups, in some embodiments, entries accessible from a B-tree, particularly the current B-tree, can be cached in a separate data structure.

Figure 4:
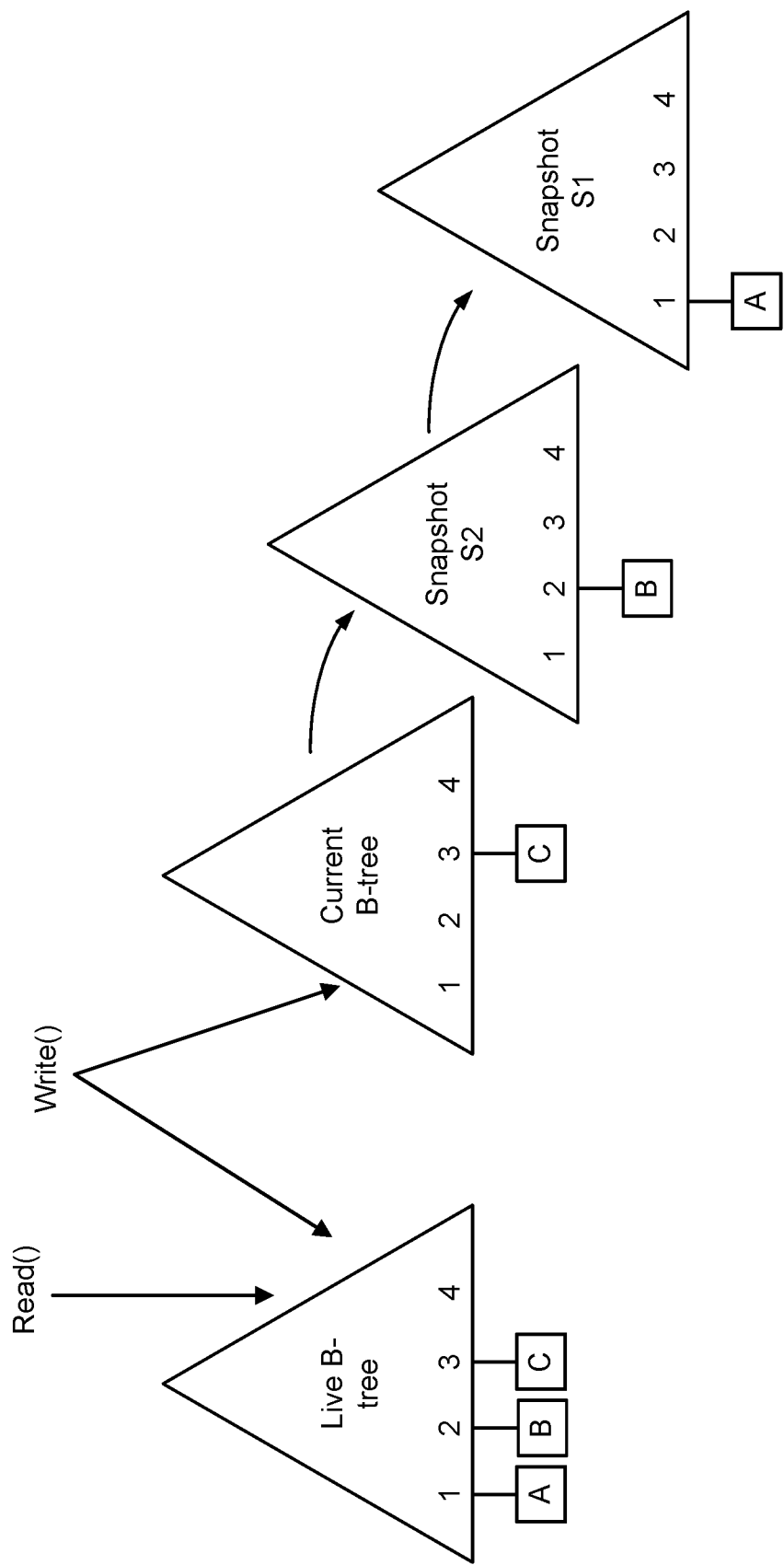
FIG. 4 is a diagram showing a set of data structures associated with a container.

FIG. 4 is a diagram showing a set of data structures associated with a container. In the example, the set of data structures includes a live B-tree, a current B-tree, Snapshot S2 at time T2, and Snapshot S1 at time T1. In the example of FIG. 4, data associated with the container may be stored at logical locations 1, 2, 3, and 4.

For example, the current B-tree, Snapshot S2 at time T2, and Snapshot S1 at time T1 may correspond to the B-trees described for the container in FIG. 3. In some embodiments, at least one other data structure associated with the container, a user history data structure that is used to track all snapshots associated with the container, is not shown in the example of FIG. 4. The user history data structure may include data that corresponds to the user visible snapshot history portion of FIG. 3.

Data structures associated with the current state and/or a snapshot of a container may be thought of as the mapping used to translate a logical location (e.g., a logical offset) to a physical location (e.g., a physical offset) for data that a user may have written. For example, the relationship between a logical offset of a data, the data structure, and the physical offset of the data may be described as follows: logical offset→data structure→physical offset. In various embodiments, the data structure can be a hash table or a B-tree. For purposes of illustration, in the example of FIG. 4, as well as other examples through the application, the data structures associated with the current state and/or a snapshot of a container comprise B-trees.

In the example, a set of data structures associated with a container includes two active data structures: the "live B-tree" and "current B-tree." The live B-tree and the current B-tree are active in the sense that they can be modified. In some embodiments, the live B-tree is optionally implemented. The use of the live B-tree can greatly enhance the efficiency of reading the current data state of the file because read operations can read directly from the live B-tree without potentially performing a costly traversal through one or more snapshots in the sequence of snapshots. In some embodiments, the live B-tree stores all offsets that are currently mapped in the container, while the current B-tree stores all offsets in the container that have been mapped since the previous snapshot was created. Put another way, the live B-tree acts as a cache of all the mappings for the current data state of the container.

A snapshot is typically a read-only file, but the current B-tree is modifiable until the next prescribed snapshot creation event occurs. For example, a prescribed snapshot creation event may be configured by a user and may comprise the elapse of an interval of time, the detection of a particular event, or the receipt of a user input to create a new snapshot. Once the next prescribed snapshot creation event is reached, the state of the current B-tree is preserved to create a new snapshot and a new empty current B-tree is created. In some embodiments, write operations to the container result in the update of both the live and current B-trees. In some embodiments, read operations of the current data state of the container result in the search of only the live B-tree. When the live B-tree is not implemented or unavailable, a read operation of the current data state of the container starts searching through the current B-tree and if a relevant mapping is not found, traverses each subsequent snapshot backward in time until the relevant mapping is found or the end of the snapshot sequence is reached. A read operation of a past state of the container results in a search through the series of snapshots. In various embodiments, each B-tree (e.g., live, current, or snapshot) is searched in a prescribed manner.

In some embodiments, a snapshot of a container is the point-in-time data state of the container at the time the snapshot was created. For example, if the container were a VM, then the snapshot is the collection of file-level snapshots of files that comprise the VM. In some embodiments, a snapshot is represented as a data structure that stores mappings to the data that was modified after the previous snapshot was created. In other words, in some embodiments, each snapshot only includes the updates to a file (i.e., deltas) for a given time period (since the creation of the previous snapshot). As a result, the snapshot may be represented by a compact space-efficient structure.

As mentioned above, when a snapshot is created, the current B-tree becomes the B-tree of the snapshot, and a new empty current B-tree is created in preparation for the next snapshot. Each snapshot is linked to the next younger and next older snapshots. In some embodiments, the links that go backward in time (i.e., the links to the next older snapshots) are traversed during read operations to the container and potentially a different container that has been synchronized to a snapshot of the former container.

Returning to the example of FIG. 4, the current B-tree is linked to (e.g., points) Snapshot S2 at time T2 and Snapshot S2 at time T2 is linked to Snapshot S1 at time T1. In some embodiments, read operations to the current data state of the container can be serviced from the live B-tree, while write operations to the container update both the live and current B-trees. In the example of FIG. 4, data A is written at time T1 at location 1 and then Snapshot S1 at time T1 is created. The data B is written at time T2 at location 2 and then Snapshot S2 at time T2 is created. The data C is written at time T3 at location 3 and tracked in the current B-tree. The live B-tree tracks the current data state of the data of the container at each of the locations 1, 2, 3, and 4 and may be updated each time that data is written to a location associated with the container. As such, the live B-tree includes data A at location 1, data B at location 2, data C at location 3, and no data at location 4 because data has not been written to the container at location 4. For example, if a new data D (not shown) is to overwrite the data currently at location 3 (data C) at time T4, then location 3 of the current B-tree would be updated to map to data D and location 3 of the live B-tree would also be updated to map to data D.

In various embodiments, a read operation on a specified snapshot for a logical block offset may proceed in the following manner: First, a lookup of the specified snapshot data structure is performed for the logical block offset of the read operation. If a mapping exists, then data is read from the physical device at the corresponding physical address and returned. Otherwise, if the mapping does not exist within the specified snapshot B-tree, the link to the next older snapshot is traversed and a search of this older snapshot's B-tree is performed. This process continues until a mapping for the logical block offset is found in a snapshot B-tree or the last snapshot in the sequence has been examined.

Figure 5:
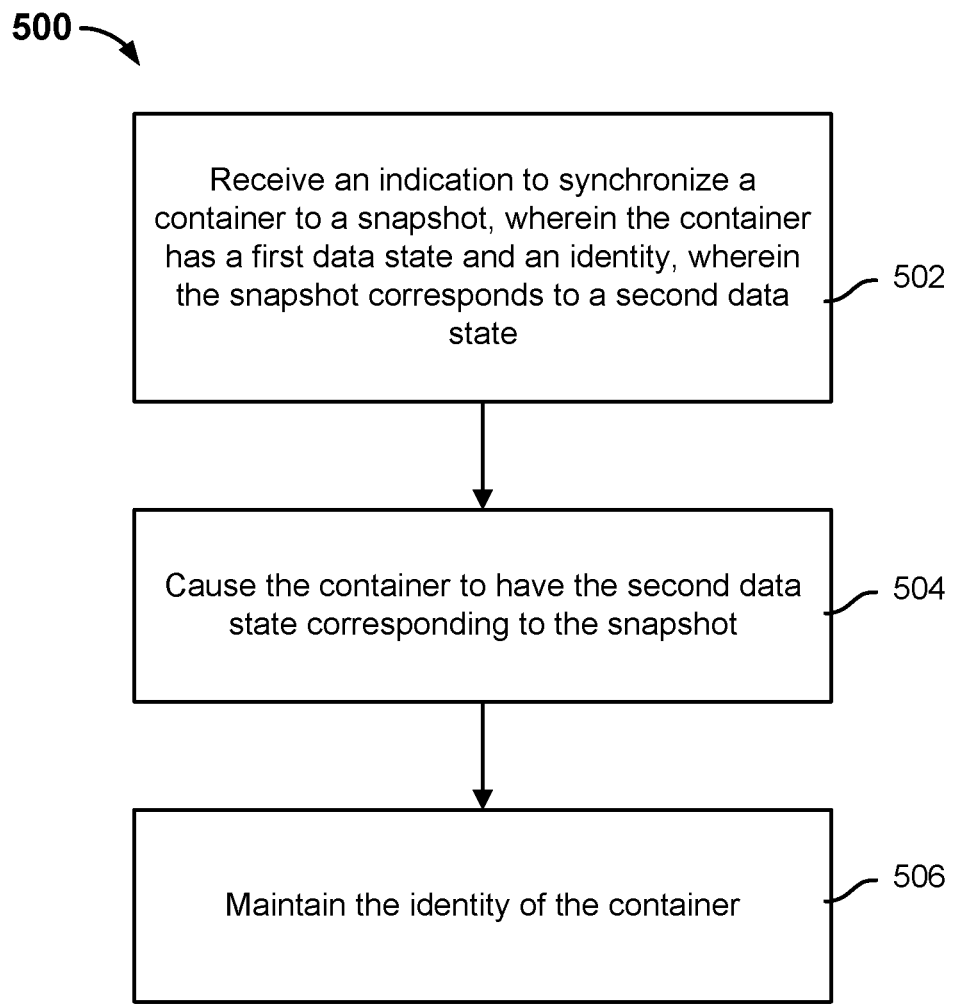
FIG. 5 is a flow diagram showing an embodiment of a process for synchronizing a container to a snapshot.

FIG. 5 is a flow diagram showing an embodiment of a process for synchronizing a container to a snapshot. In some embodiments, process 500 is performed wholly or partly by a storage system and/or other processing system, for example, one configured to execute computer instructions that implement the steps of process 500.

At 502, an indication to synchronize a container to a snapshot is received, wherein the container has a first data state and an identity, wherein the snapshot corresponds to a second data state. Examples of a container include a VM, a vdisk, or a file. The indication to synchronize a container may be received from, for example, a software application, an administrator user, or a scheduled activity. The container may be synchronized to a snapshot of its own or a snapshot belonging to a different container. In some embodiments, a container corresponding to a VM of a first type can be synchronized to a snapshot associated with a VM of the first type or of a second type. For example, the type of VM may be determined by the type of guest operating system running in the VM or the number and size of vdisks contained within the VM.

The first data state of the container includes the current data state of the container. The second data state associated with the snapshot includes the data state mapped to by the snapshot at the point-in-time the snapshot was created and potentially one or more older snapshots linked to by the snapshot. Synchronizing the container to a snapshot refers to changing the current data state of the container to the data state of the snapshot. In various embodiments, a "data state" refers to the underlying physical data and/or metadata associated with a container at a point-in-time.

At 504, the container is caused to have the second data state corresponding to the snapshot. The container can be caused to have the second data state by various different techniques. In some embodiments, the container is caused to have the second data state corresponding to the snapshot by emptying the current B-tree associated with the container and setting the newly-emptied current B-tree to point to the snapshot. In some embodiments, the container is caused to have the second data state corresponding to the snapshot by first deleting the existing current B-tree for the container, then creating a new empty current B-tree for the container, and setting the new empty current B-tree to point to the snapshot. In some embodiments, the container is caused to have the second data state corresponding to the snapshot by first deleting the existing current B-tree of the container, then creating a new container and an empty current B-tree for the new container, and setting the empty current B-tree of the new container to point to the snapshot. After the container is caused to have the second data state corresponding to the snapshot, the data state of the container is identical to the second data state corresponding to the snapshot until data associated with the container is modified (e.g., existing data is modified or new data is stored with the container).

In various embodiments, causing the container to have the data state of the snapshot does not require duplicating the underlying physical data associated with the snapshot, but rather causes the current B-tree for the container to reference the snapshot, which maps to the physical data associated with the data state of the snapshot. This way, physical data already associated with a snapshot can be reused in a synchronization process to represent a current data state of a container. Synchronization as described in various embodiments herein can be performed efficiently because immediately after synchronization (e.g., prior to changes being made to the container), read operations to the container can be serviced by the snapshot (or an older snapshot to which it is linked).

In some embodiments, causing the container to have the data state of the snapshot includes overwriting at least some metadata and/or data of the container with metadata and/or data of the snapshot. In some embodiments, causing the container to have the data state of the snapshot includes creating references from the container to at least some metadata and/or data of the snapshot.

At 506, the identity of the container is maintained. In various embodiments, the identity of the container is maintained subsequent to the container being caused to have the second data state. In some embodiments, maintaining the identity of the container comprises preserving the identity. By preserving the identity of the container, the container can continue to be recognized as the same container by the rest of the system after the synchronization process has completed. Maintaining preserves the identity of the container to what it was just prior to the synchronization. In various embodiments, prior to allowing reading of the container, the identity of the container, after being caused to have the data state of the snapshot, can be restored to the container's identity before the container was caused to have the content of the snapshot. In some embodiments, without preserving the identity of the container, some identity information of the container may be overwritten by the identity information associated with the snapshot (or the other container associated with the snapshot) when the container was synchronized to the snapshot.

In various embodiments, criteria for preserving the identity of a container vary depending on the type of the container and the intended use of the container. For a file, the identity may be determined by its inode number or file handle. For a vdisk, the identity may be determined by a disk signature written to the disk. For a VM, the identity may be determined by a UUID and/or SID, stored in the VM configuration or member vdisk by the hypervisor management system and/or guest operating system (OS). The identity of the VM may also require preserving the name and IP address of the VM by which it is known to other VMs and components of the system. In some embodiments, at least some identity data is stored in the container itself and, therefore, for example, preserving identity may involve overwriting data in the container (e.g., in the current B-tree of the container). In some embodiments, preserving identity may involve preserving metadata associated with the container that is maintained separately to the contents of the container. In some embodiments, non-identity related metadata of the container may also be modified after the synchronization process.

In some embodiments, synchronization of the container to the snapshot in itself does not modify a user history data structure associated with the container. As mentioned before, the user history data structure stores data indicating snapshots, if any, that are associated with a particular container. Before synchronization, the user history data structure may indicate zero or more snapshots that have already been generated for the container. Immediately after synchronization, the user history data structure associated with the container is not automatically modified. The user history data structure may be modified when a new snapshot is generated for the container sometime after the synchronization process.

In some embodiments, sometime after the identity of the container has been maintained, the identity may be modified (e.g., in response to a user input) to be the same as the identity of the snapshot to which the container is synchronized, or the identity of some other existing container, or a new identity that did not previously exist. Modifying the identity of the container may include modifying existing data structures and/or creating new data structures.

Figure 6:
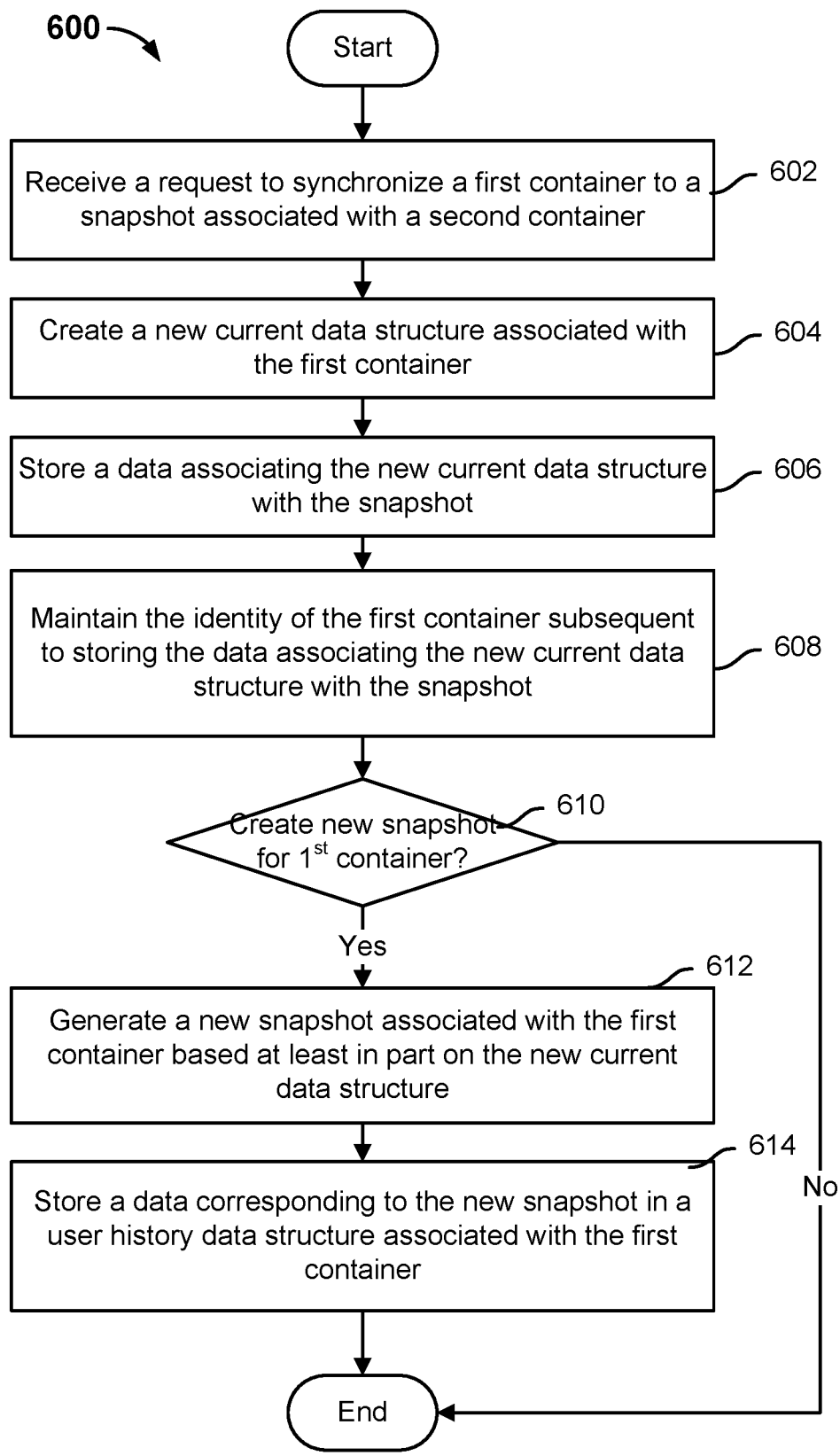
FIG. 6 is a flow diagram showing an example of synchronizing a first container to a snapshot associated with a second container.

FIG. 6 is a flow diagram showing an example of synchronizing a first container to a snapshot associated with a second container. In some embodiments, process 600 is performed wholly or partly by a storage system and/or other processing system, for example, one configured to execute computer instructions that implement the steps of process 600. In some embodiments, process 500 of FIG. 5 can be implemented using process 600.

In the example of process 600, the first container is a different container than the second container.

At 602, a request to synchronize a first container to a snapshot associated with a second container is received. The request to synchronize a first container to a snapshot associated with a second container can be generated by a software application, an administrator user, or a scheduled activity, for example.

In some embodiments, the request can indicate that the first container should be synchronized to a current data state (e.g., current data structure) of the second container. If the request indicates to synchronize the first container to the current data state of the second container, then a snapshot can be made based on the current data structure (e.g., current B-tree) of the second container. The synchronization process may proceed based on the newly-generated snapshot of the second container.

At 604, a new current data structure associated with the first container is created. In some embodiments, creating a new current data structure associated with the first container refers to emptying an existing current data structure (e.g., deleting all the mappings included in a current B-tree) associated with the first container. In some embodiments, creating a new current data structure associated with the first container refers to first deleting an existing current data structure (e.g., current B-tree) associated with the first container, and then creating a new, empty current data structure for the first container. In some embodiments, creating a new current data structure associated with the first container refers to deleting an existing current data structure (e.g., current B-tree) associated with the first container, and then creating a new container and an empty current B-tree for the new container.

In some embodiments, if the existing current data structure of the first container is not empty (i.e., it includes one or more stored mappings to data), a snapshot can be generated for the first container, based on the existing current data structure, prior to creating the new current data structure. If such a snapshot were generated for the first container, a data corresponding to the snapshot can be stored in a user history data structure associated with the first container.

At 606, a data associating the new current data structure with the snapshot is stored. A reference (e.g., a pointer) from the new current data structure of the first container to the snapshot of the second container is stored. In some embodiments, the reference is stored at least partially in the new current data structure of the first container. In some embodiments, the reference is stored at least partially external to the new current data structure of the first container. Immediately after storing the reference to the snapshot of the second container (e.g., prior to new data being stored in the first container), a read to the current data state of the first container will be directed to and serviced by the snapshot of the second container.

At 608, the identity of the first container is maintained subsequent to storing the data associating the new current data structure with the snapshot. Values stored in the underlying data of the first container, values stored in the new current data structure of the first container, and/or metadata stored external to the contents of the first container can be modified to restore at least some identity information of the first container that may have been overwritten by the identity information of the second container when the reference from the new current data structure of the first container to the snapshot of the second container was stored.

After the synchronization process has completed, any changes to the current data state of the first container (e.g., writes of new data or writes to modify existing data) update the new current data structure for the first container.

In some embodiments, a read or write operation to the first container is not permitted, or is buffered until the identity of the first container is preserved.

At 610, it is determined whether or not to create a new snapshot for the first container. A new snapshot may be created after the synchronization process has completed. The new snapshot may be created in response to a prescribed snapshot creation event. Examples of prescribed snapshot creation events include a elapse of a predetermined interval for creating snapshots, an input from a user administrator, and a request from a software application. In the event that it is determined that a new snapshot is to be created, control is transferred to 612. Otherwise, in the event that it is determined that a new snapshot is not to be created, process 600 ends.

At 612, a new snapshot associated with the first container is generated based at least in part on the new current data structure. For example, a new snapshot can be generated for the first container after the synchronization process has completed based on renaming the current data structure as a snapshot and creating a new, empty current data structure for the first container.

At 614, a data corresponding to the new snapshot is stored in a user history data structure associated with the first container. Data corresponding to the new snapshot generated for the first container after the synchronization process has completed can be stored in the user history data structure associated with the first container. Any snapshots corresponding to data stored in the user history data structure associated with the first container, regardless of whether they were created before or after a synchronization process, are associated with the first container and can be included in a user visible snapshot history (e.g., a display of available snapshots at a user interface) associated with the first container.

FIG. 7 is a diagram showing an example of synchronization of container A to a snapshot associated with container B. In this example, at time T0, container A has two snapshots, Snapshots S2 and S1, and container B has Snapshot S11. At time T1, container A is synchronized to Snapshot S11 belonging to container B. In the example of FIG. 7, container A is synchronized to Snapshot S11 belonging to container B by first deleting container A's existing current B-tree, then creating a new, empty current B-tree for container A, and setting the new, empty current B-tree to point to container B's Snapshot S11 (instead of container A's Snapshot S2). Any reads to container A, immediately after the synchronization, will, therefore, reflect the data state as of container B's Snapshot S11. Note that synchronization in itself does not automatically change the user visible snapshot history: immediately after the synchronization, before a new snapshot can be created for container A, container A still has snapshots S2 and S1. After container A is synchronized to Snapshot S11 of container B, any writes to container A (e.g., to add new data or to modify existing data) will update the new current B-tree of container A. At time T2, a new Snapshot S3 is created for container A (e.g., based on renaming the current B-tree of container A and creating a new, empty current B-tree for container A). Note that Snapshot S3 points to Snapshot S11 because the current B-tree from which Snapshot S3 was created was set to point to Snapshot S11. Data corresponding to Snapshot S3 is added to the user history data structure associated with container A, and based on the data stored in that user history data structure associated with container A, a user can now see Snapshots S3, S2 and S1 belonging to container A in the user visible snapshot history. In addition to synchronizing the contents of Snapshot S11, some metadata associated with container B (e.g., container size and certain attributes) may also be synchronized.

In modifying the data state, in some embodiments, synchronization must be careful to preserve the identity of the container. In the above example, at time T2, the content of container A is initially identical to the content of B's snapshot S11. However, for all practical purposes, container A must continue to be recognized as container A by the rest of the system. This means that depending on whether container A is a file, vdisk or VM, the inode ID, file handle, VM UUID and/or SID of container A must be preserved. If these IDs are stored as data in the container itself, then the current B-tree of container A may be modified to restore these values to those consistent with A's identity before allowing reading of the container. Without preservation, some identity information of container A may be overwritten by the identity information of B when container A was synchronized to snapshot S11. The preservation step restores the identity of container A that existed just prior to the synchronization. In some cases, this may involve overwriting data in container A, which would update container A's current B-tree. In other cases, it may involve preserving metadata associated with container A that is maintained separately to the data contents of container A.

In some embodiments, sometime after preserving the identity of container A, the identity of container A may be modified (e.g., in response to a user input) to be the same as the identity of another container. For example, the identity of container A can be modified to be the same as the identity of existing container B or the identity of a newly created container, container C. Modifying the identity of container A may include modifying and/or creating data structures. For example, modifying the identity of container A to be the same as the identity of container B may include deleting a user history data structure associated with container B.

Figure 8:
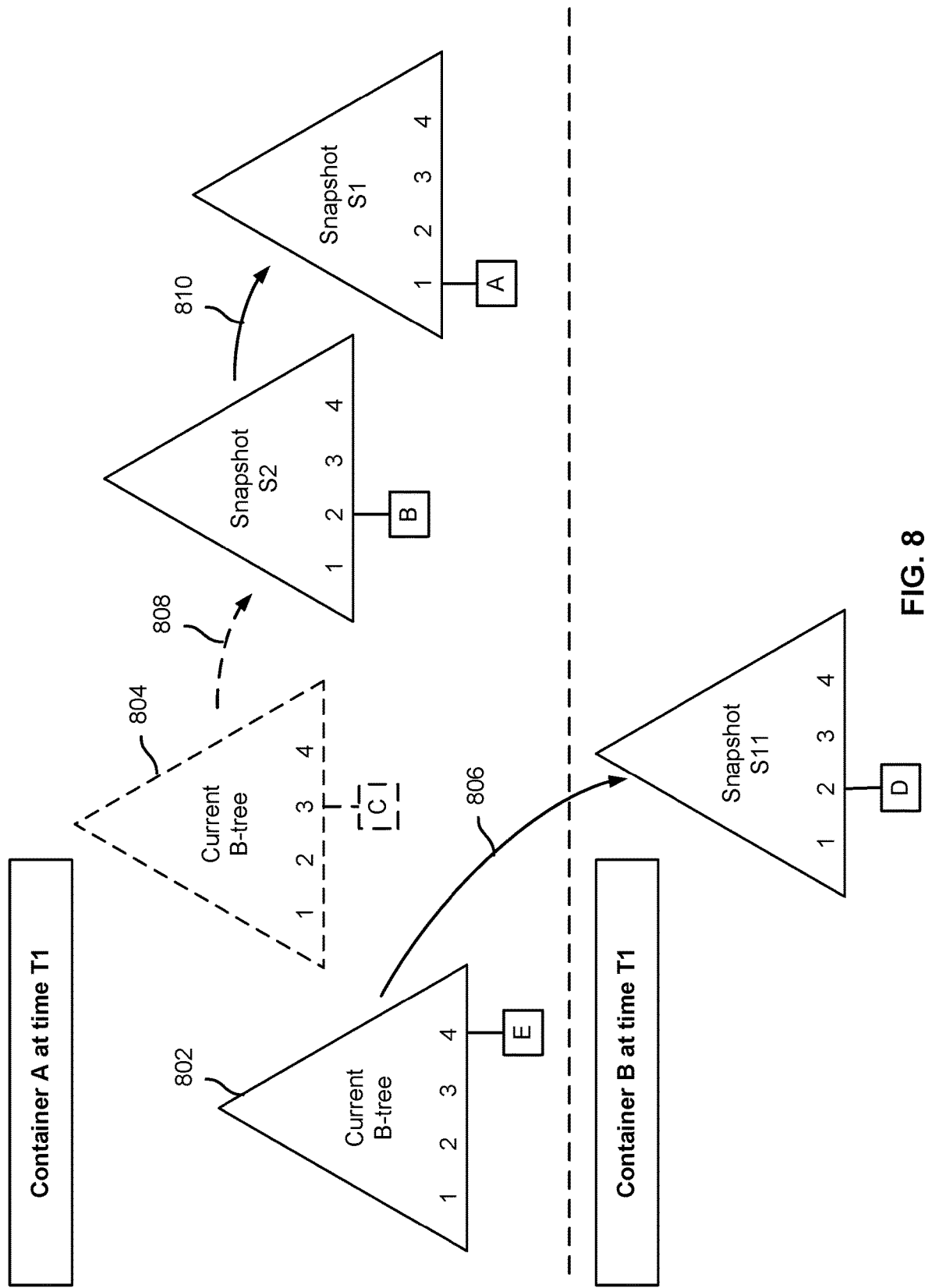
FIG. 8 shows a diagram of the data structures associated with the synchronization of container A to Snapshot S11 of container B.

FIG. 8 shows a diagram of the data structures associated with the synchronization of container A to Snapshot S11 of container B. The example in FIG. 8 shows another view of the data structures involved in the synchronization of container A to Snapshot S11 of container B as described in FIG. 7 at time T1. In this example, at time T1, container A is synchronized to Snapshot S11 by virtue of deleting container A's existing current B-tree (current B-tree 804), creating a new, empty current B-tree (current B-tree 802) for container A, and setting current B-tree 802 to point to Snapshot S11 of container B via link 806. In the example of FIG. 8, current B-tree 804 includes a mapping of location 3 to data C, which is deleted along with current B-tree 804 during synchronization, but in other examples, prior to performing the synchronization, if current B-tree 804 is determined to include at least one mapping, a snapshot may be generated from current B-tree 804 so as to preserve the mapping. In the example of FIG. 8, link 808 (e.g., a pointer) from current B-tree 804 to container A's Snapshot S2 is also deleted when current B-tree 804 is deleted in the synchronization process.

Prior to the synchronization (prior to time T1), the existing current B-tree of container A (current B-tree 804) pointed to Snapshot S2, which pointed to Snapshot S1 via link 810 (e.g., a pointer). Thus, prior to the synchronization, a read operation to the current data state of container A would start searching through current B-tree 804 and if a relevant mapping was not found, the search would traverse to container A's Snapshot S2 next. If the relevant mapping still could not be found, the search would traverse to container A's Snapshot S1 last. As a first example, prior to the synchronization, a read operation for data at location 3 of container A would be found in current B-tree 804 and data C would be returned. As a second example, prior to the synchronization, a read operation for data at location 2 of container A would be found in container A's Snapshot S2 and data B would be returned.

In the example of FIG. 8, link 808 (e.g., a pointer) from current B-tree 804 to container A's Snapshot S2 is also deleted when current B-tree 804 is deleted in the synchronization process. After synchronization, current B-tree 802 is set to point to container B's Snapshot S11. Note that current B-tree 802 is not set to point to container A's Snapshot S2. However, in various embodiments, both Snapshots S2 and S1 are still associated with container A by virtue of data stored in container A's user history data structure (not shown).

After the synchronization occurs at time T1 (and prior to a new snapshot being generated for container A), a read operation to the current data state of container A starts searching through current B-tree 802 and if a relevant mapping is not found, the search traverses to container B's Snapshot S11 (and if Snapshot S11 pointed to another older snapshot, the search may traverse to the older snapshot if the relevant mapping is not found in Snapshot S11). Thus, by synchronizing the data state of container A to that of container B's Snapshot S11, a read operation to container A may be serviced by Snapshot S11 (or an older snapshot to which Snapshot S11 points). For example, after synchronization and prior to updates having been made to current B-tree 802, a read operation for data at location 2 of container A can be found in container B's Snapshot S11 to return data D. In some embodiments, while a user may be aware that container A was synchronized to Snapshot S11 of container B, a user may not know when a read operation to container A was actually satisfied based on a snapshot generated for container B.

In the example of FIG. 8, sometime after time T1 but prior to time T2, data E was written to container A at location 4. Therefore, current B-tree 802 is updated to include a mapping from logical location 4 to the physical storage location of data E.

Figure 9:
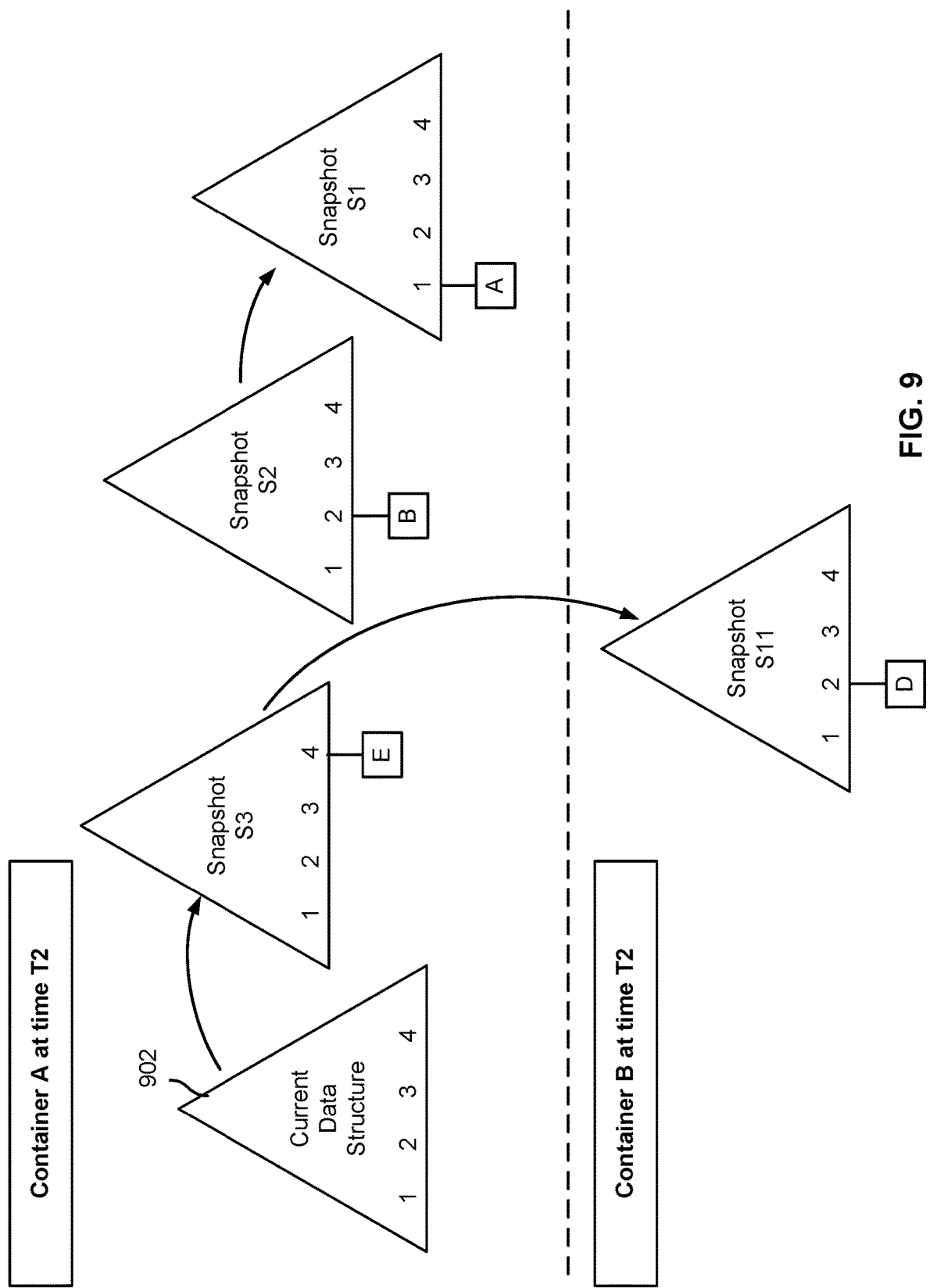
FIG. 9 shows a diagram of the data structures associated with container A after synchronization to Snapshot S11 of container B has occurred.

FIG. 9 shows a diagram of the data structures associated with container A after synchronization to Snapshot S11 of container B has occurred. The example in FIG. 9 shows another view of the data structures involved in generating a new snapshot, Snapshot S3, for container A at time T2, after container A was synchronized to Snapshot S11 container B at time T2, as described in FIGS. 7 and 8. In this example, at time T2, a prescribed snapshot generation event occurs for container A (e.g., the preconfigured interval associated with generating a snapshot for container A has elapsed). Therefore, a new snapshot for container A, Snapshot S3, is generated, for example, based on current B-tree 802 from FIG. 8 and a new, empty current B-tree for container A, current B-tree 902, is also generated. A corresponding data is stored in the user history data structure of container A for the creation of Snapshot S3. Because Snapshot S3 was generated based on current B-tree 802 from FIG. 8, Snapshot S3 includes the mapping at location 4 to data E that was included in current B-tree 802 from FIG. 8 and also points to container B's Snapshot S11. While Snapshot S3 does not point to container A's snapshots that were generated prior to the synchronization process (Snapshots S2 and S1), Snapshot S3 can be related to Snapshots S2 and S1 and presented with Snapshots S2 and S1 in a user visible snapshot history of container A based on the data stored in the user history data structure associated with container A. After Snapshot S3 is generated at time T2, a read operation to the current data state of container A starts searching through current B-tree 902 and if a relevant mapping is not found, the search traverses to container A's Snapshot S3, and if the relevant mapping is not found, the search traverses to container B's Snapshot S11.

Figure 10:
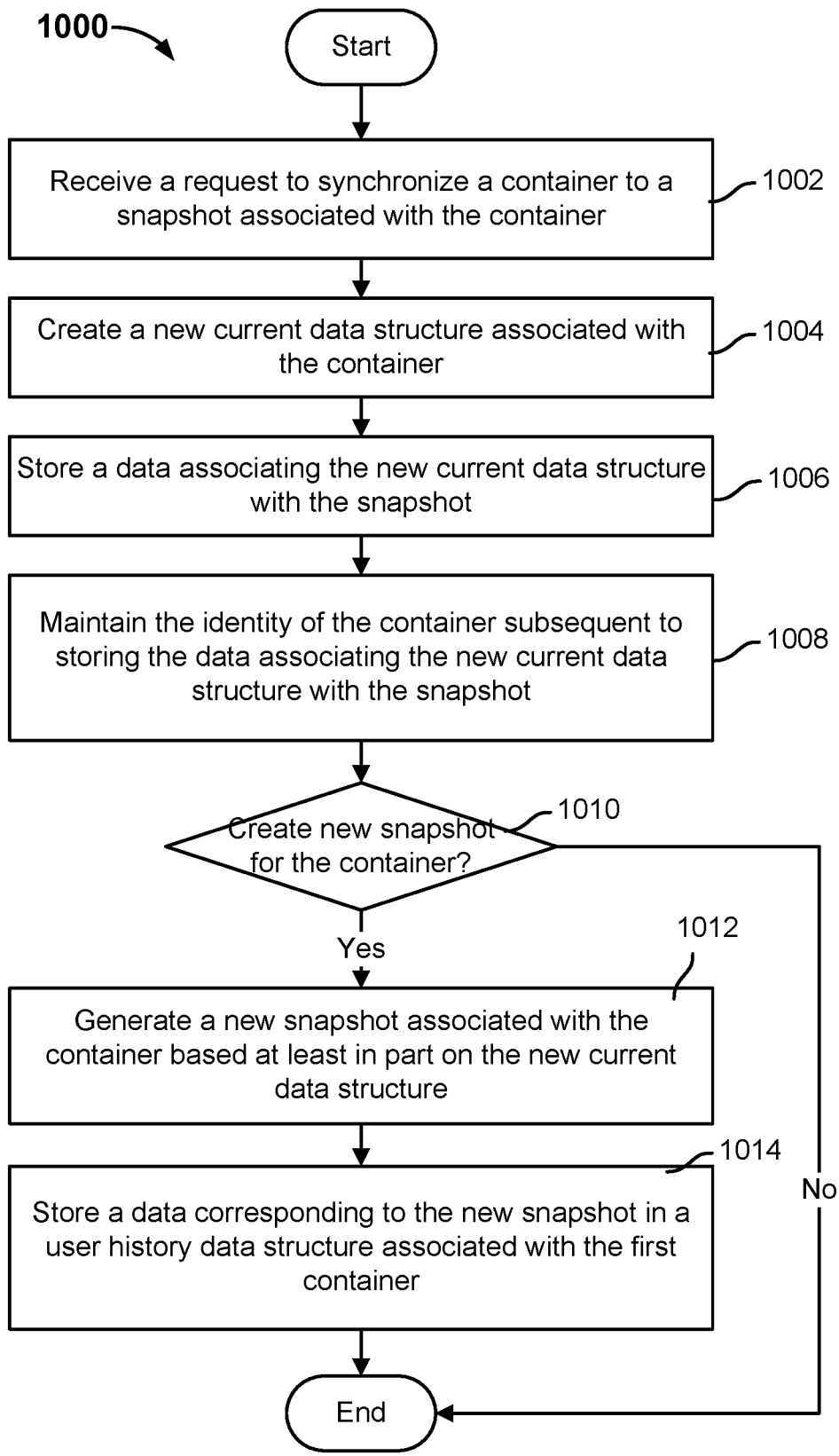
FIG. 10 is a flow diagram showing an example of synchronizing a container to its own snapshot.

FIG. 10 is a flow diagram showing an example of synchronizing a container to its own snapshot. In some embodiments, process 1000 is performed wholly or partly by a storage system and/or other processing system, for example, one configured to execute computer instructions that implement the steps of process 1000. In some embodiments, process 500 of FIG. 5 can be implemented using process 1000.

In the example of process 1000, a container is synchronized to one of its own snapshots. Put another way, process 1000 describes an example of "self-synchronization," where the current data state of the container is reverted back to its own data state at an earlier point in time.

At 1002, a request to synchronize a container to a snapshot associated with the container is received. The request to synchronize a container to its own snapshot can be generated by a software application, an administrator user, or a scheduled activity, for example. For example, when the current data state of a container becomes corrupted, a user may desire to revert the data state of the container to an earlier data state prior to the corruption.

At 1004, a new current data structure associated with the container is created. In some embodiments, creating a new current data structure associated with the container refers to emptying an existing current data structure (e.g., deleting all the mappings included in a current B-tree) associated with the container. In some embodiments, creating a new current data structure associated with the container refers to first deleting an existing current data structure (e.g., current B-tree) associated with the container, and then creating a new empty current data structure for the container. In some embodiments, creating a new current data structure associated with the container refers to deleting an existing current data structure (e.g., current B-tree) associated with the container, and then creating a new container and an empty current B-tree for the new container.

In some embodiments, if the existing current data structure of the container is not empty (i.e., it includes one or more stored mappings to data), a snapshot can be generated for the container based on the existing current data structure prior to creating the new current data structure. If such a snapshot were generated for the container, a data corresponding to the snapshot can be stored in a user history data structure associated with the container.

At 1006, a data associating the new current data structure with the snapshot is stored. A reference (e.g., a pointer) from the new current data structure of the container to the snapshot of the same container is stored. In some embodiments, the reference is stored at least partially in the new current data structure of the container. In some embodiments, the reference is stored at least partially external to the new current data structure of the container. Immediately after storing the reference to the snapshot of the same container (e.g., prior to new data being stored in the container), a read to current data state of the container will be directed to and serviced by that snapshot.

At 1008, the identity of the container is maintained subsequent to storing the data associating the new current data structure with the snapshot. Values stored in the new current data structure of the container and/or metadata stored external to the contents of the container can be modified, if applicable, to restore at least some identity information of the container that may have been overwritten by the older identity information associated with the snapshot when the reference from the new current data structure of the container to the snapshot was stored.

After the synchronization process has completed, any changes to the current data state of the container (e.g., writes of new data or writes to modify existing data) update the new current data structure for the container.

In some embodiments, a read or write operation to the container is not permitted or is buffered until the identity of the container is preserved.

At 1010, it is determined whether or not to create a new snapshot for the container. A new snapshot may be created after the synchronization process has completed. The new snapshot may be created in response to an event. Examples of prescribed snapshot creation events include an elapse of a predetermined interval for creating snapshots, an input from a user administrator, and a request from a software application. In the event that it is determined that a new snapshot is to be created, control is transferred to 1012. Otherwise, in the event that it is determined that a new snapshot is not to be created, process 1000 ends.

At 1012, a new snapshot associated with the container is generated based at least in part on the new current data structure. For example, a new snapshot can be generated for the container after the synchronization process has completed based on renaming the current data structure as a snapshot and creating a new empty current data structure for the container.

At 1014, a data corresponding to the new snapshot is stored in a user history data structure associated with the container. Data corresponding to the new snapshot generated for the container after the synchronization process has completed can be stored in the user history data structure associated with the container. Any snapshots corresponding to data stored in the user history data structure associated with the container, regardless of whether they were created before or after a synchronization process, are associated with the container and can be included in a user visible snapshot history (e.g., a display of snapshots at a user interface) associated with the container.

Figure 11:
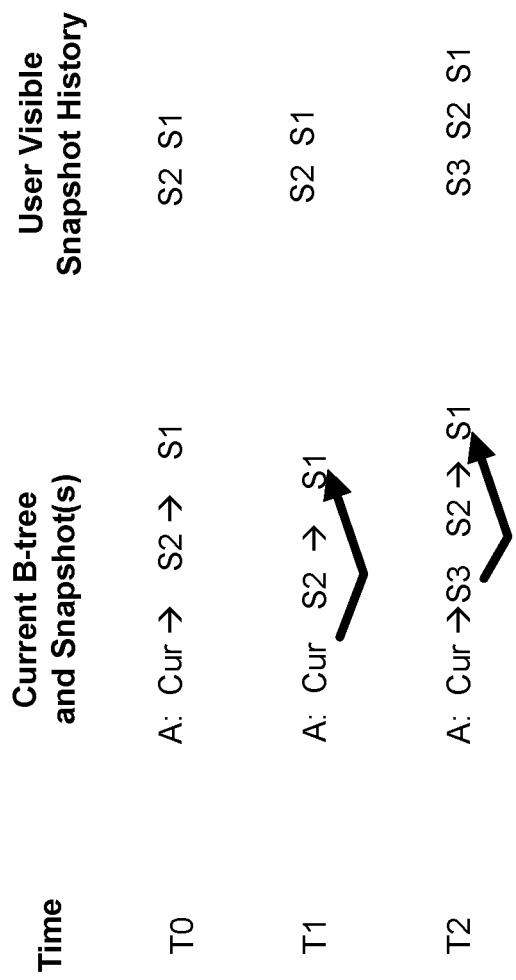
FIG. 11 is a diagram showing an example of self-synchronization in which container A is synchronized to a snapshot owned by container A.

FIG. 11 is a diagram showing an example of self-synchronization in which container A is synchronized to a snapshot owned by container A. In this example, at time T0, container A has two snapshots, Snapshots S2 and S1. At time T1, container A is self-synchronized to one of its own snapshots, Snapshot S1. This type of synchronization "reverts" the current data state of container A to an earlier point in time. In the example of FIG. 11, container A is synchronized to its own Snapshot S1 by first deleting container A's existing current B-tree, then creating a new, empty current B-tree for container A, and setting the new, empty current B-tree to point to Snapshot S1 (instead of Snapshot S2). Any reads to container A, immediately after the synchronization, will now return the data state of the system as of Snapshot S1.

In various embodiments, a self-synchronization process does not automatically delete any younger snapshots that were created after the snapshot to which the container was synchronized. In the example of FIG. 11, after container A is synchronized to Snapshot S1, Snapshot S2, which was created for container A after Snapshot S1, is preserved and tracked by the user visible snapshot history, even though the current B-tree of the container no longer points to Snapshot S2.

At time T2, a new snapshot, Snapshot S3, which points to S1, is created for container A. Data corresponding to Snapshot S3 is added to the user history data structure associated with container A and based on the data stored in that user history data structure associated with container A, a user can now see Snapshots S3, S2 and S1 belonging to container A. Despite the synchronization, Snapshot S2, has not been deleted and is available for future operations such as synchronization with container A or another container.

In reverting the data state of a container to a data state earlier in time, in some embodiments, the identity of the container is to be preserved. In some embodiments, because self-synchronization synchronizes the container to its own snapshot and not to a snapshot of a different container, less identity information of the container may need to be modified to restore the synchronized container to its identity prior to the synchronization. In some embodiments, preserving the identity of the container in cases of self-synchronization may include modifying the container's own contents (e.g., the current data structure) and/or metadata associated with the container that is maintained separate to the contents of the container.

Figure 12:
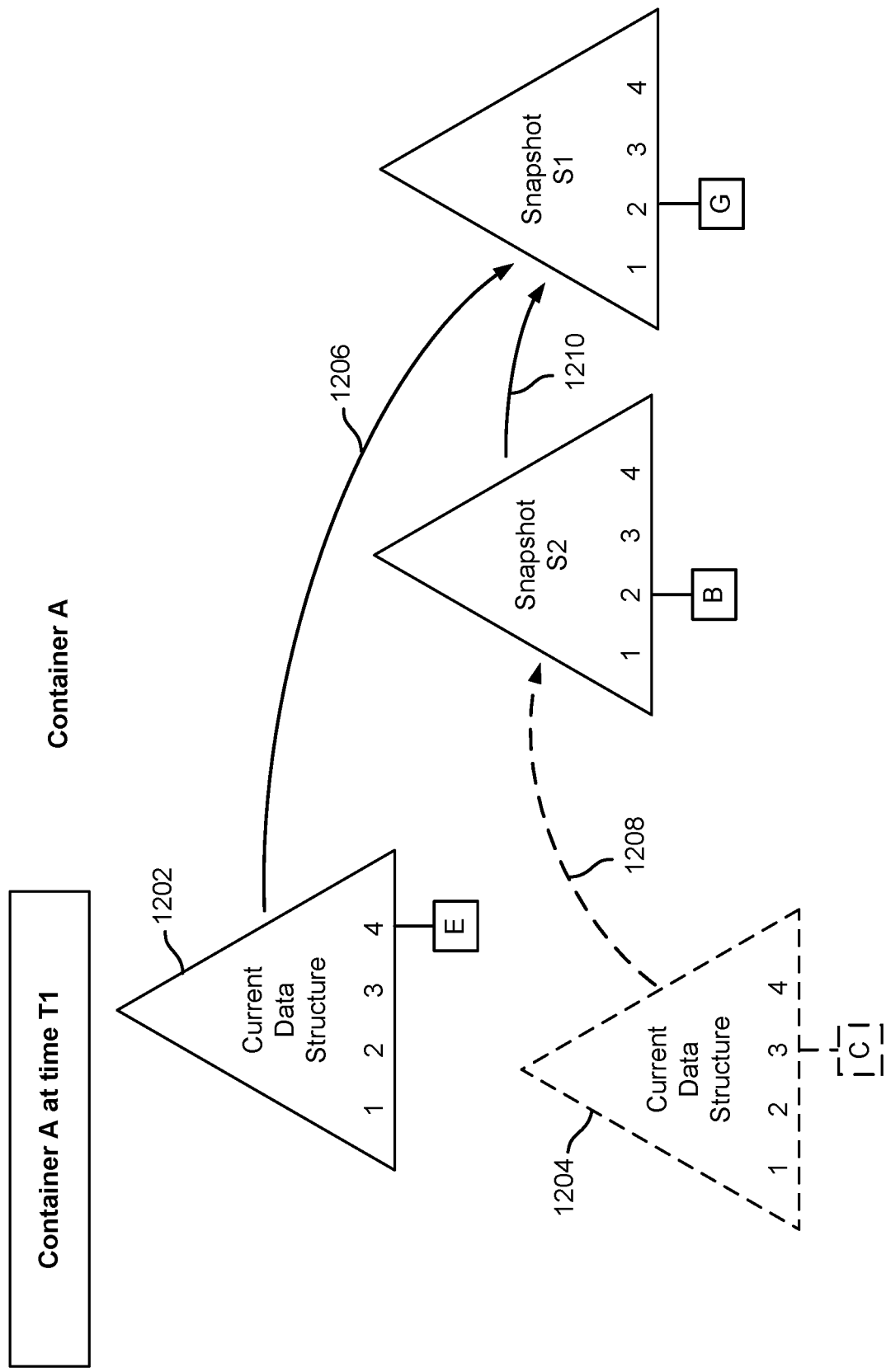
FIG. 12 shows a diagram of the data structures associated with the self-synchronization of container A to its own Snapshot S1.

FIG. 12 shows a diagram of the data structures associated with the self-synchronization of container A to its own Snapshot S1. The example in FIG. 12 shows another view of the data structures involved in the synchronization of container A to its own Snapshot S1 as described in FIG. 11 at time T1. In this example, at time T1, container A is synchronized to Snapshot S1 by virtue of deleting container A's existing current B-tree (current B-tree 1204), creating a new, empty current B-tree (current B-tree 1202) for container A, and setting current B-tree 1202 to point to Snapshot S1 via link 1206. In the example of FIG. 12, current B-tree 1204 includes a mapping of location 3 to data C, which is deleted along with current B-tree 1204 during synchronization, but in other examples, prior to performing the synchronization, if current B-tree 1204 is determined to include at least one mapping, a snapshot may be generated from current B-tree 1204 so as to preserve the mapping. In the example of FIG. 12, link 1208 (e.g., a pointer) from current B-tree 1204 to container A's Snapshot S2 is also deleted when current B-tree 1204 is deleted in the synchronization process.

As mentioned above, in various embodiments, a self-synchronization process does not automatically delete any younger snapshots that were created after the snapshot to which the container was synchronized. In the example of FIG. 12, after container A is synchronized to Snapshot S1, Snapshot S2, which was created for container A after Snapshot S1, is preserved and tracked in the user history data structure associated with container A, even though current B-tree 1202 of container A does not point to Snapshot S2.

Prior to the synchronization (prior to time T1), the existing current B-tree of container A, current B-tree 1204 pointed to Snapshot S2, which pointed to Snapshot S1 via link 1210 (e.g., a pointer). Thus, prior to the synchronization, a read operation to the current data state of container A would start searching through current B-tree 1204 and if a relevant mapping was not found, the search would traverse to container A's Snapshot S2 next, and if the relevant mapping still could not be found, the search traversed to container A's Snapshot S1 last. As a first example, prior to the synchronization, a read operation for data at location 3 of container A would be found in current B-tree 1204 to return data C. As a second example, prior to the synchronization, a read operation for data at location 2 of container A would be found in container A's Snapshot S2 and data B was returned.

In the example of FIG. 12, link 1208 (e.g., a pointer) from current B-tree 1204 to container A's Snapshot S2 is also deleted when current B-tree 1204 is deleted in the synchronization process. After synchronization, current B-tree 1202 is set to point to container A's own Snapshot S1. Note that current B-tree 1202 is not set to point to container A's Snapshot S2. However, in various embodiments, both Snapshots S2 and S1 are still associated with container A by virtue of data stored in container A's user history data structure (not shown).

After the synchronization occurs at time T1 (and prior to a new snapshot being generated for container A), a read operation to the current data state of container A starts searching through current B-tree 1202 and if a relevant mapping is not found, the search traverses to Snapshot S1. Thus, by synchronizing the current data state of container A to the previous data state of container A at Snapshot S1, a read operation to container A may be serviced by Snapshot S1. For example, after synchronization and prior to updates having been made to current B-tree 1202, a read operation for data at location 2 of container A can be found in container A's Snapshot S1 to return data G.

In the example of FIG. 12, sometime after time T1 but prior to time T2, data E was written to container A at location 4. Therefore, current B-tree 1202 is updated to include a mapping from logical location 4 to the physical storage location of data E.

Figure 13:
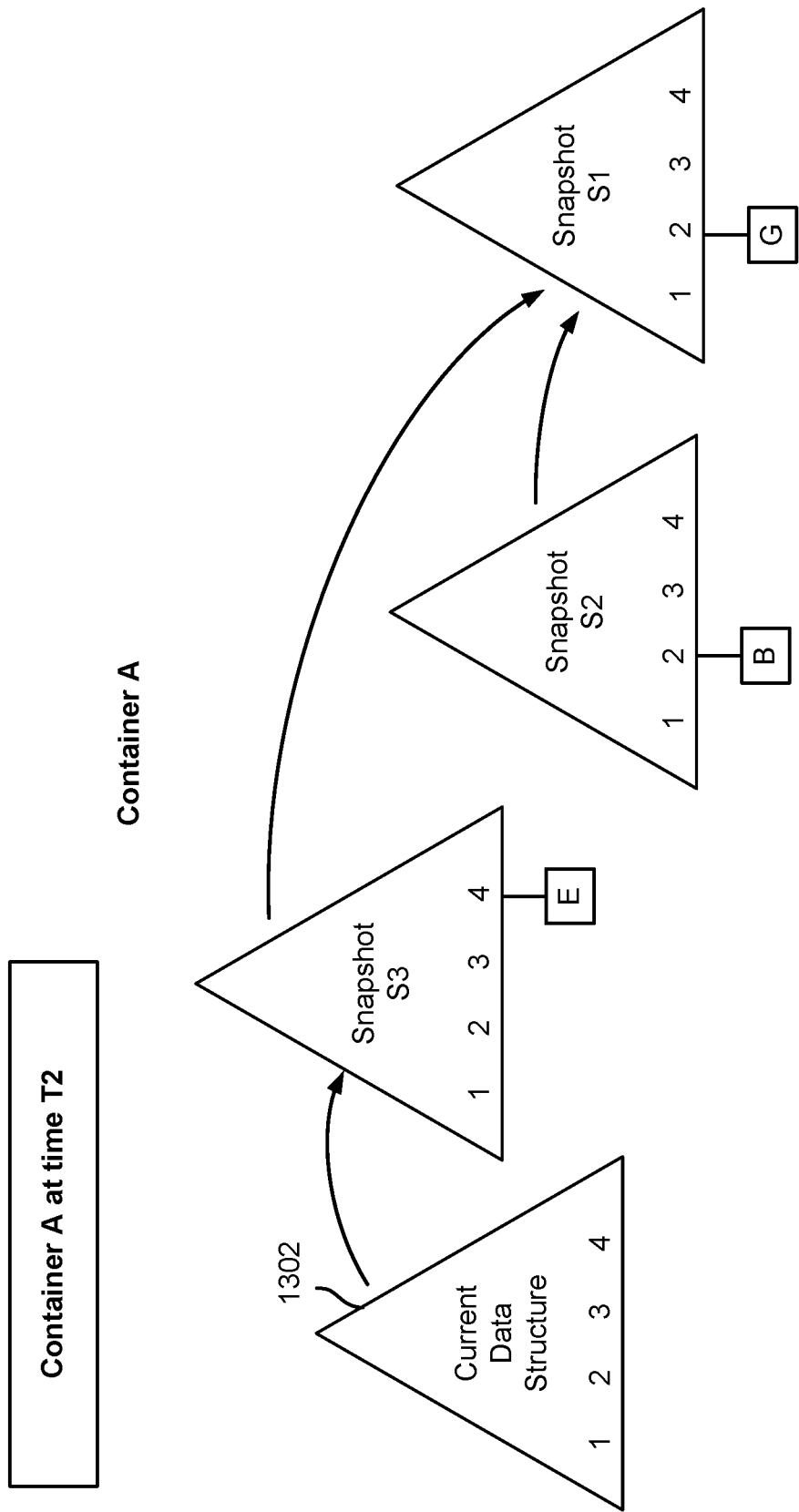
FIG. 13 shows a diagram of the data structures associated with container A after self-synchronization to its own Snapshot S1 has occurred.

FIG. 13 shows a diagram of the data structures associated with container A after self-synchronization to its own Snapshot S1 has occurred. The example in FIG. 13 shows another view of the data structures involved in generating a new snapshot, Snapshot S3, for container A at time T2, after container A was synchronized to its own Snapshot S1 at time T1, as described in FIGS. 11 and 12. In this example, at time T2, a prescribed snapshot generation event occurs for container A (e.g., the preconfigured interval associated with generating a snapshot for container A has elapsed). Therefore, a new snapshot for container A, Snapshot S3, is generated, for example, based on current B-tree 1202 from FIG. 12 and a new, empty current B-tree for container A, current B-tree 1302, is also generated. A corresponding data is stored in the user history data structure of container A for the creation of Snapshot S3. Because Snapshot S3 was generated based on current B-tree 1202 from FIG. 12, Snapshot S3 includes the mapping at location 4 to data E that was included in current B-tree 1202 from FIG. 12 and also points to container A's own Snapshot S1. Snapshot S3 can be related to Snapshots S2 and S1 and presented with Snapshots S2 and S1 in a user visible snapshot history of container A based on the data stored in the user history data structure associated with container A. After Snapshot S3 is generated at time T2, a read operation to the current data state of container A starts searching through current B-tree 1302 and if a relevant mapping is not found, the search traverses to container A's Snapshot S3, and if the relevant mapping is not found, the search traverses to Snapshot S1.

Figure 14:
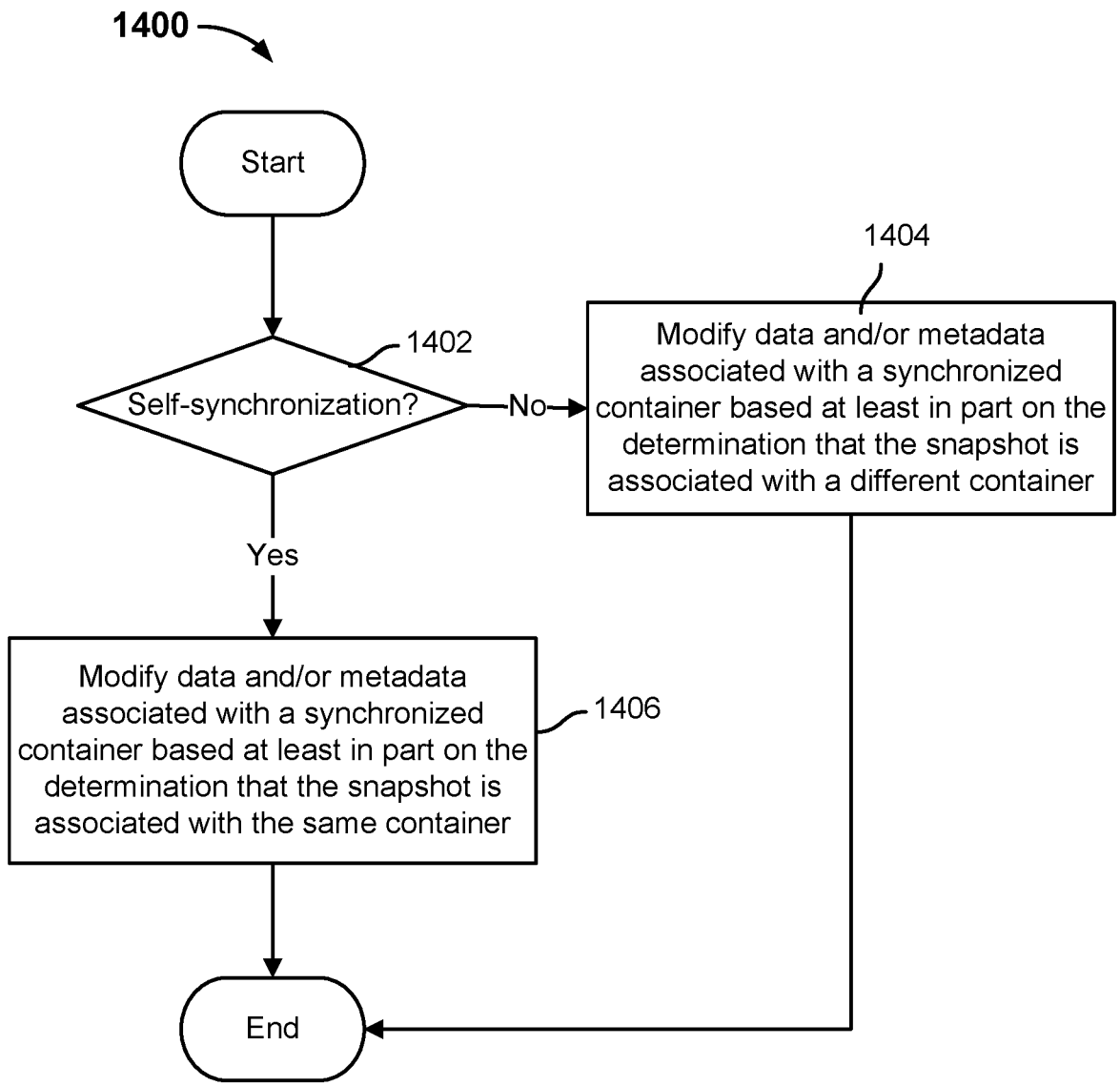
FIG. 14 is a flow diagram showing an embodiment of a process of modifying metadata associated with a container in a synchronization process.

FIG. 14 is a flow diagram showing an embodiment of a process of modifying metadata associated with a container in a synchronization process. In some embodiments, process 1400 is performed wholly or partly by a storage system and/or other processing system, for example, one configured to execute computer instructions that implement the steps of process 1400.

In some embodiments, modifying the data and/or metadata associated with a container that is synchronized (sometimes referred to as a "synchronized container") with a snapshot includes preserving the identity of the container after the synchronization to the container's identity before the synchronization. Process 1400 is used to illustrate that the modification of the data and/or metadata associated with a container that is synchronized with a snapshot is dependent on the type of synchronization that has occurred: self-synchronization, in which a container is synchronized to one of its own snapshots, or synchronization of a container to a snapshot belonging to a different container. In various embodiments, the data and/or metadata that is modified for the synchronized container may be stored internal to the container and/or external to the container.

At 1402, it is determined whether a synchronization that is occurring comprises a self-synchronization. In the event that the synchronization is not a self-synchronization and the container is being synchronized to a snapshot of a different container, control is transferred to 1404. Otherwise, in the event that the synchronization is a self-synchronization in which a container is being synchronized to one of its own snapshots, control is transferred to 1406.

At 1404, data and/or metadata associated with a synchronized container is modified based at least in part on the determination that the snapshot is associated with a different container. In some embodiments, a set of rules may be configured by a user (e.g., an administrative user) for modifying the metadata of a container in the event that the container has been synchronized to a snapshot belonging to a different container. For example, each such rule may check whether a condition associated with the synchronized container, the snapshot, and/or the other container associated with the snapshot is true and if so, to perform a certain action.

A first example rule for modifying the data and/or metadata of a container in the event that the container has been synchronized to a snapshot belonging to a different container is to check whether the synchronization process has overwritten any identity information of the synchronized container with identity information of the other container and if so, to restore value(s) associated with the identity of the container that may have been synchronized to the identity of the different container associated with the snapshot. As mentioned before, an identity of a container may depend on the container's type. For example, for a file, the identity may be determined by its inode number or file handle. For a vdisk, the identity may be determined by a disk signature written to the disk. For a VM, the identity may be determined by a UUID and/or SID, stored in the VM configuration or member vdisk by the hypervisor management system and/or guest OS. Therefore, if it is determined that the identity information of the synchronized container has been at least partially overwritten during the synchronization process, the identity information of the synchronized container is restored to the identity information of the container prior to the synchronization.

A second example rule for modifying the data and/or metadata of a container in the event that the container has been synchronized to a snapshot belonging to a different container is to check whether a guest OS signature copied from the snapshot is different from the prior guest OS signature of the synchronized container and if so, to restore the guest OS signature to what it was prior to the synchronization.

A third example rule for modifying the data and/or metadata of a container in the event that the container has been synchronized to a snapshot belonging to a different container is to check whether security access controls copied from the snapshot are different from the prior security access controls of the synchronized container and if so, to restore the security access controls of the container to what they were prior to the synchronization. Examples of security access controls include which users have which levels of privilege in accessing data.

A fourth example rule for modifying the data and/or metadata of a container in the event that the container has been synchronized to a snapshot belonging to a different container is to check whether the space usage of the synchronized container needs to be updated to account for the difference in space usage by the container as a result of synchronizing to (e.g., pointing to) data associated with the other container and if so, to update the total space usage of the synchronized container to account for either the addition of space or reduction of space occupied by the data associated with the container after the synchronization.

At 1406, data and/or metadata associated with a synchronized container is modified based at least in part on the determination that the snapshot is associated with the same container. In some embodiments, a set of rules may be configured by a user (e.g., an administrative user) for modifying the data and/or metadata of a container in the event that the container has been synchronized to one of its own snapshots. The set of rules for modifying the data and/or metadata of the container that has been synchronized to one of its own snapshots may be at least partially different or entirely distinct from the set of rules that may be configured for modifying the metadata of a container in the event that the container has been synchronized to a snapshot belonging to a different container.

A first example rule for modifying the data and/or metadata of a container in the event that the container has been synchronized to a snapshot belonging to the same container is to check whether security access controls copied from the snapshot are different from the prior security access controls of the synchronized container and if so, to restore the security access controls of the container to what they were prior to the synchronization. Examples of security access controls include which users have which levels of privilege in accessing data.

Figure 15:
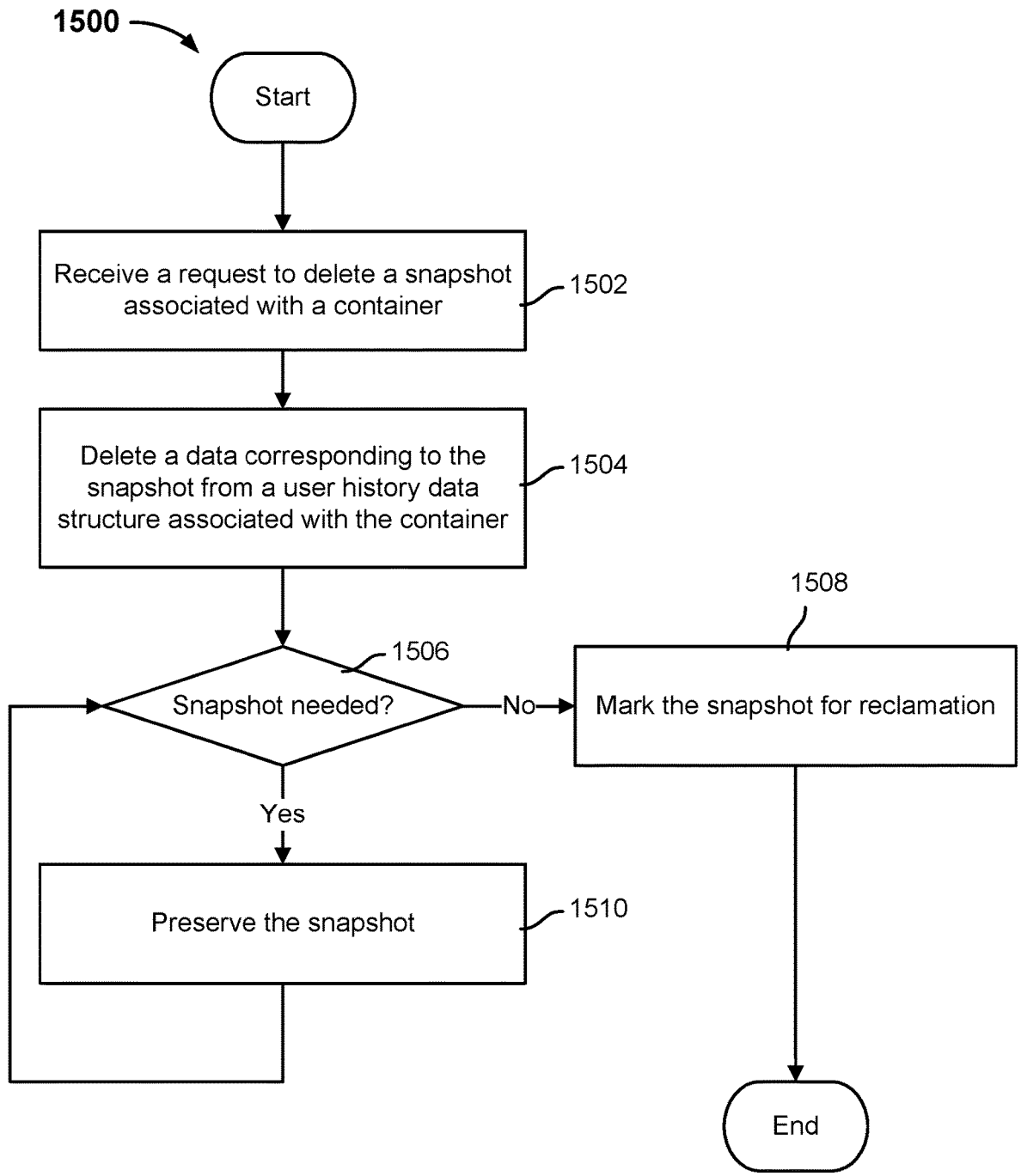
FIG. 15 is a flow diagram showing an embodiment of a process for deleting a snapshot.

FIG. 15 is a flow diagram showing an embodiment of a process for deleting a snapshot. In some embodiments, process 1500 is performed wholly or partly by a storage system and/or other processing system, for example, one configured to execute computer instructions that implement the steps of process 1500.

At 1502, a request to delete a snapshot associated with a container is received. For example, a user may request to delete a particular snapshot from a container.

At 1504, a data corresponding to the snapshot is deleted from a user history data structure associated with the container. As described above, the user history data structure associated with a container stores data corresponding to each snapshot associated with that container. In response to the deletion request, the data corresponding to the snapshot that has been requested to be deleted is removed/deleted from the user history data structure. Because the user visible snapshot history of the container that is presented to the user is based on the data stored in the user history data structure, after the data corresponding to the snapshot is removed/deleted, that snapshot will be omitted from the snapshot history that is presented to the user.

While the snapshot requested to be deleted is immediately removed from the user visible snapshot, the snapshot data structure (e.g., B-tree) may be maintained until it is no longer needed.

At 1506, it is determined whether the snapshot is still needed. In the event that the snapshot is no longer needed, control is transferred to 1508. Otherwise, in the event that the snapshot is still needed, control is transferred to 1510. For example, the snapshot data structure may still be needed to support read operations to a container that was previously synchronized to the snapshot. However, if the snapshot data structure is no longer needed to support any read operations, it may be marked for reclamation.

At 1508, the snapshot is marked for reclamation. The snapshot data structure that is no longer needed is marked for reclamation and may be reclaimed in the background by a garbage collection process.

At 1510, the snapshot is preserved until it is determined at 1506 that the snapshot is no longer needed. Because the snapshot data structure is still needed, the snapshot data structure is preserved (i.e., not marked for reclamation) until it is determined to be no longer needed.

Figure 16:
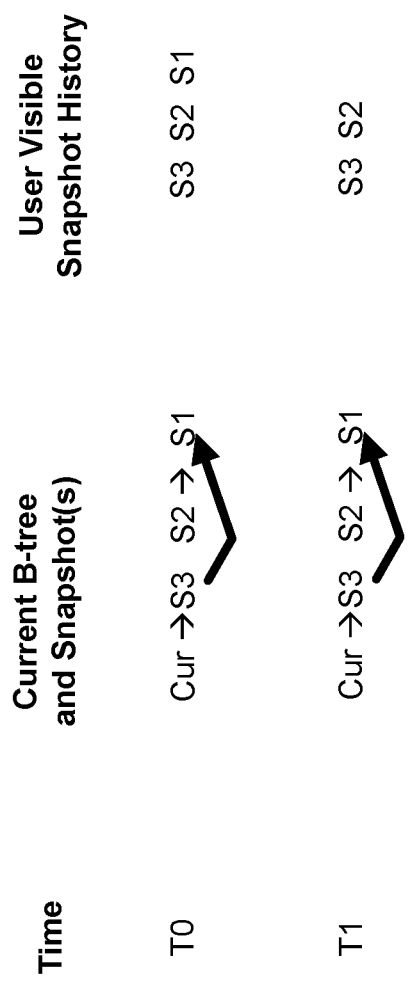
FIG. 16 is a diagram showing an example of deleting a snapshot associated with a container.

FIG. 16 is a diagram showing an example of deleting a snapshot associated with a container. In some embodiments, the data structure (e.g., B-tree) associated with a deleted snapshot will not be immediately reclaimed because the snapshot is needed by another snapshot that was created after a synchronization operation. In the example of FIG. 16, at time T0, the container has three snapshots, Snapshots S3, S2 and S1. Snapshot S3 was created after Snapshot S2, and after the container was synchronized to Snapshot S1. At time T1, the user deletes Snapshot S1, but B-tree S1 is still required to support reading from Snapshots S2 and S3, and therefore cannot be immediately reclaimed without "merging" any needed changes to both B-trees S2 and S3. In either case, however, in some embodiments, the user visible snapshot history can be immediately updated to exclude S1 and automatically reclaim B-tree S1 "in the background" when it is no longer needed. This is generally more convenient for the user than to disallow the deletion and force the user to remember to delete the snapshot at a later time when B-tree S1 is no longer needed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a write operation to write a data value to a first container;
perform the write operation including to store a mapping to a storage location of the data value to an existing current data structure associated with the first container;
receive an indication to synchronize a current data state of the first container to match a data state that is represented by a snapshot of a second container without duplicating at least a subset of physical data associated with the snapshot of the second container, wherein the first container has identity information that comprises a first identity value, wherein data corresponding to the snapshot of the second container is stored in a second container user history data structure, wherein the data corresponding to the snapshot of the second container that is stored in the second container user history data structure corresponds to a second container user visible snapshot history, wherein the second container user visible snapshot history comprises a display at a user interface;
provide a new current data structure associated with the first container, wherein the new current data structure is configured to store new data that is to be written to the first container, wherein to provide the new current data structure comprises to empty the existing current data structure associated with the first container by at least deleting the mapping to the storage location of the data value from the existing current data structure;
store a pointer that associates the new current data structure associated with the first container to the snapshot of the second container;
receive a read operation to the first container;
determine that the identity information of the first container has been at least partially overwritten by identity information of the second container associated with the snapshot, wherein the identity information of the second container comprises a second identity value, wherein the second identity value is different from the first identity value;
in response to the determination that the identity information of the first container has been at least partially overwritten, restore the identity information of the first container to the first identity value that is associated with the identity information of the first container prior to the new current data structure having been provided for the first container; and
perform the read operation to the first container including to:
use the pointer that associates the new current data structure associated with the first container to the snapshot of the second container to access the snapshot of the second container; and search for a requested mapping requested by the read operation at the snapshot of the second container; and a memory coupled to the processor and configured to store the snapshot.

2. The system of claim 1, wherein the first container comprises one or more of the following types: a virtual machine, a virtual disk, and a file.

3. The system of claim 1, wherein to restore the identity information of the first container to the first identity value comprises to modify data associated with the first container, modify metadata associated with the first container, or both.

4. The system of claim 1, wherein the first container comprises a different container from the second container.

5. The system of claim 1, wherein the first container and the second container are a same container, and wherein the data state corresponding to the snapshot comprises an earlier-in-time data state associated with the first container.

6. The system of claim 1, wherein the processor is further configured to generate a new snapshot associated with the first container based at least in part on the new current data structure.

7. The system of claim 6, wherein the processor is further configured to store a data corresponding to the new snapshot in a first container user history data structure associated with the first container, wherein the first container user history data structure includes a data corresponding to a previously generated snapshot associated with the first container, wherein the previously generated snapshot was generated prior to receipt of the indication to synchronize the current data state of the first container to match the data state that is represented by the snapshot of the second container.

8. The system of claim 1, wherein the read operation comprises a first read operation, wherein the processor is further configured to:
receive an indication to delete the snapshot of the second container;
remove the data corresponding to the snapshot of the second container from the second container user history data structure associated with the second container;
determine that the first container has been synchronized to the snapshot of the second container such that the snapshot of the second container is configured to support a second read operation to the first container; and
in response to the determination that the first container has been synchronized to the snapshot of the second container, preserve the snapshot of the second container.

9. The system of claim 1, wherein the processor is further configured to:
determine that data requested by the read operation is not found in the new current data structure.

10. A method, comprising:
receiving a write operation to write a data value to a first container;
performing the write operation including to store a mapping to a storage location of the data value to an existing current data structure associated with the first container;
receiving an indication to synchronize a current data state of the first container to match a data state that is represented by a snapshot of a second container without duplicating at least a subset of physical data associated with the snapshot of the second container, wherein the first container has identity information that comprises a first identity value, wherein data corresponding to the snapshot of the second container is stored in a second container user history data structure, wherein the data corresponding to the snapshot of the second container that is stored in the second container user history data structure corresponds to a second container user visible snapshot history, wherein the second container user visible snapshot history comprises a display at a user interface;
providing a new current data structure associated with the first container, wherein the new current data structure is configured to store new data that is to be written to the first container, wherein to provide the new current data structure comprises to empty the existing current data structure associated with the first container by at least deleting the mapping to the storage location of the data value from the existing current data structure;
storing a pointer that associates the new current data structure associated with the first container to the snapshot of the second container;
receiving a read operation to the first container;
determining that the identity information of the first container has been at least partially overwritten by identity information of the second container associated with the snapshot, wherein the identity information of the second container comprises a second identity value, wherein the second identity value is different from the first identity value;
in response to the determination that the identity information of the first container has been at least partially overwritten, restoring the identity information of the first container to the first identity value that is associated with the identity information of the first container prior to the new current data structure having been provided for the first container; and
performing the read operation to the first container including:
using the pointer that associates the new current data structure associated with the first container to the snapshot of the second container to access the snapshot of the second container; and
searching for a requested mapping requested by the read operation at the snapshot of the second container.

11. The method of claim 10, wherein the first container comprises one or more of the following types: a virtual machine, a virtual disk, and a file.

12. The method of claim 10, wherein restoring the identity information of the first container to the first identity value comprises modifying data associated with the first container, modifying metadata associated with the first container, or both.

13. The method of claim 10, wherein the first container comprises a different container from the second container.

14. The method of claim 10, wherein the first container and the second container are a same container, and wherein the data state corresponding to the snapshot comprises an earlier-in-time data state associated with the first container.

15. The method of claim 14, further comprising storing a data corresponding to the new snapshot in a first container user history data structure associated with the first container, wherein the first container user history data structure includes a data corresponding to a previously generated snapshot associated with the first container, wherein the previously generated snapshot was generated prior to receipt of the indication to synchronize the current data state of the first container to match the data state that is represented by the snapshot of the second container.

16. The method of claim 10, wherein the read operation comprises a first read operation, further comprising:

receiving an indication to delete the snapshot of the second container;

removing the data corresponding to the snapshot of the second container from the second container user history data structure associated with the second container;

determining that the first container has been synchronized to the snapshot of the second container such that the snapshot of the second container is configured to support a second read operation to the first container; and in response to the determination that the first container has been synchronized to the snapshot of the second container, preserving the snapshot of the second container.

17. A computer program product, the computer program product comprising a non-transitory computer readable storage medium and comprising computer instructions for:

receiving a write operation to write a data value to a first container;

performing the write operation including to store a mapping to a storage location of the data value to an existing current data structure associated with the first container;

receiving an indication to synchronize a current data state of the first container to match a data state that is represented by a snapshot of a second container without duplicating at least a subset of physical data associated with the snapshot of the second container, wherein the first container has identity information that comprises a first identity value, wherein data corresponding to the snapshot of the second container is stored in a second container user history data structure, wherein the data corresponding to the snapshot of the second container that is stored in the second container user history data structure corresponds to a second container user visible snapshot history, wherein the second container user visible snapshot history comprises a display at a user interface;

providing a new current data structure associated with the first container, wherein the new current data structure is configured to store new data that is to be written to the first container, wherein to provide the new current data structure comprises to empty the existing current data structure associated with the first container by at least deleting the mapping to the storage location of the data value from the existing current data structure;

storing a pointer that associates the new current data structure associated with the first container to the snapshot of the second container;

receiving a read operation to the first container;

determining that the identity information of the first container has been at least partially overwritten by identity information of the second container associated with the snapshot, wherein the identity information of the second container comprises a second identity value, wherein the second identity value is different from the first identity value;

in response to the determination that the identity information of the first container has been at least partially overwritten, restoring the identity information of the first container to the first identity value that is associated with the identity information of the first container prior to the new current data structure having been provided for the first container; and performing the read operation to the first container including:

using the pointer that associates the new current data structure associated with the first container to the snapshot of the second container to access the snapshot of the second container; and searching for a requested mapping requested by the read operation at the snapshot of the second container.

18. The computer program product of claim 17, wherein the read operation comprises a first read operation, further comprising computer instructions for:

receiving an indication to delete the snapshot of the second container;

removing the data corresponding to the snapshot of the second container from the second container user history data structure associated with the second container;

determining that the first container has been synchronized to the snapshot of the second container such that the snapshot of the second container is configured to support a second read operation to the first container; and in response to the determination that the first container has been synchronized to the snapshot of the second container, preserving the snapshot of the second container.

* * * * *